United States Patent
Sidhu et al.

(10) Patent No.: US 9,763,247 B2
(45) Date of Patent: Sep. 12, 2017

(54) OPTIMIZING NETWORK PERFORMANCE USING BAND-SWITCHING OPERATIONS

(71) Applicant: Belkin International, Inc., Playa Vista, CA (US)

(72) Inventors: Gursharan Sidhu, Moorpark, CA (US); Ryan Yong Kim, Rolling Hills Estates, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 194 days.

(21) Appl. No.: 14/294,109

(22) Filed: Jun. 2, 2014

(65) Prior Publication Data

US 2015/0351096 A1    Dec. 3, 2015

(51) Int. Cl.
*H04W 72/04*    (2009.01)
*H04W 84/12*    (2009.01)

(52) U.S. Cl.
CPC ........ *H04W 72/0453* (2013.01); *H04W 84/12* (2013.01)

(58) Field of Classification Search
CPC .............. H04W 72/0453; H04W 88/04; H04B 7/15542
See application file for complete search history.

(56) References Cited

U.S. PATENT DOCUMENTS

2006/0056352 A1*  3/2006  Proctor .............. H04B 7/15542
                                                          370/332
2007/0280155 A1  12/2007  Le et al.
(Continued)

FOREIGN PATENT DOCUMENTS

| EP | 2 530 850 A2 | 12/2012 |
|---|---|---|
| EP | 2 530 851 A2 | 12/2012 |
| WO | 2004/047308 A2 | 6/2004 |
| WO | 2015/187556 A1 | 12/2015 |
| WO | 2016/014557 A1 | 1/2016 |

OTHER PUBLICATIONS

Edimax: "EW-7238RPD N300+ Concurrent Dual-Band Universal Wi-Fi Extender," Jan. 3, 2013, pp. 1-4, Retrieved from the Internet: URL:http://www.edimax.com/images/Image/datasheet/Wireless/EW-7238RPD/EW-72385RPD_Datasjeet_v1.1_2013Jan03.pdf [retrieved on Aug. 4, 2015].
(Continued)

*Primary Examiner* — Donald Mills
*Assistant Examiner* — Henry Baron
(74) *Attorney, Agent, or Firm* — Kilpatrick Townsend & Stockton LLP

(57) ABSTRACT

Techniques and systems for using band-switching operations are provided. For example, a method, computing device, or computer-program product may be provided, and may include receiving a communication, wherein the communication is received on a channel of a first WiFi frequency band, and wherein the communication is received using a first WiFi circuit of the computing device. The method, computing device, or computer-program product may further include determining a second WiFi frequency band on which to transmit the communication, wherein the second WiFi frequency band is different from the first WiFi frequency band, and transmitting the communication, wherein the communication is transmitted on a channel of the second WiFi frequency band, wherein the communication is transmitted using a second WiFi circuit of the computing device, and wherein the determining and transmitting are performed when a band-switching operation is enabled.

18 Claims, 14 Drawing Sheets

(56) References Cited

U.S. PATENT DOCUMENTS

| | | | |
|---|---|---|---|
| 2009/0264093 A1 | 10/2009 | Rothschild | |
| 2010/0115272 A1 | 5/2010 | Batta | |
| 2013/0121161 A1* | 5/2013 | Szabo | H04L 43/0876 370/241 |
| 2015/0130552 A1* | 5/2015 | Bhagat | H01F 38/14 333/12 |
| 2015/0271829 A1* | 9/2015 | Amini | H04W 88/08 370/329 |
| 2016/0029384 A1 | 1/2016 | Sidhu et al. | |

OTHER PUBLICATIONS

International Search Report and Written Opinion issued in International Application No. PCT/US2015/033534 dated Aug. 25, 2015, 13 pages.

International Search Report and Written Opinion issued in International Application No. PCT/US2015/041368 dated Feb. 25, 2015, 11 pages.

"IEEE Standard for Information 1-27 technology—Telecommunications and information exchange between systems Local and metropolitan area networks—Specific requirements Part 11: Wireless LAN Medium Access Control (MAC) and Physical Layer (PHY) Specifications; IEEE Std 802.11-2012 (Revision of IEEE Std 802.1" IEEE STD 802.11-2012. IEEE Computer Society. New York. USA. Mar. 29, 2012 (Mar. 29, 2012). pp. 1-2793. XP068050195. ISBN: 978-0-7381-7211-8.

Van Zhang et al., "Wireless Mesh Networking": Wireless Mesh Networking, Jan. 2007 (Jan. 1, 2007) Auerbach Publications XP055187521 ISBN: 978-0-84-937399-2.

Pre-Interview First Office Action of Dec. 10, 2015 for U.S. Appl. No. 14/339,191; 5 pages.

First Action Interview Office Action Summary of Feb. 9, 2016 for U.S. Appl. No. 14/339,191; 5 pages.

\* cited by examiner

600

RECEIVE A COMMUNICATION, WHEREIN THE COMMUNICATION IS RECEIVED ON A CHANNEL OF A FIRST WIFI FREQUENCY BAND, AND WHEREIN THE COMMUNICATION IS RECEIVED USING A FIRST WIFI CIRCUIT
602

↓

DETERMINE A SECOND WIFI FREQUENCY BAND ON WHICH TO TRANSMIT THE COMMUNICATION, WHEREIN THE SECOND WIFI FREQUENCY BAND IS DIFFERENT FROM THE FIRST WIFI FREQUENCY BAND
604

↓

TRANSMIT THE COMMUNICATION, WHEREIN THE COMMUNICATION IS TRANSMITTED ON A CHANNEL OF THE SECOND WIFI FREQUENCY BAND, WHEREIN THE COMMUNICATION IS TRANSMITTED USING A SECOND WIFI CIRCUIT, AND WHEREIN THE DETERMINING AND TRANSMITTING ARE PERFORMED WHEN A CROSS-BAND OPERATION IS ENABLED
606

RECEIVE A COMMUNICATION, WHEREIN THE COMMUNICATION IS RECEIVED ON A CHANNEL OF A FIRST FREQUENCY BAND, AND WHEREIN THE COMMUNICATION IS RECEIVED USING A FIRST CIRCUIT CONFIGURED TO TRANSMIT AND RECEIVE SIGNALS OF THE FIRST FREQUENCY BAND
702

↓

DETERMINE A SECOND FREQUENCY BAND ON WHICH TO TRANSMIT THE COMMUNICATION, WHEREIN THE SECOND FREQUENCY BAND IS DIFFERENT FROM THE FIRST FREQUENCY BAND
704

↓

TRANSMIT THE COMMUNICATION, WHEREIN THE COMMUNICATION IS TRANSMITTED ON A CHANNEL OF THE SECOND FREQUENCY BAND, WHEREIN THE COMMUNICATION IS TRANSMITTED USING A SECOND CIRCUIT CONFIGURED TO TRANSMIT AND RECEIVE SIGNALS OF THE SECOND FREQUENCY BAND, AND WHEREIN THE DETERMINING AND TRANSMITTING ARE PERFORMED WHEN A CROSS-BAND OPERATION IS ENABLED
706

FIG. 7

OPTIMIZING NETWORK PERFORMANCE USING BAND-SWITCHING OPERATIONS

FIELD

The present disclosure relates to optimizing network performance. Specifically, various techniques and systems are provided for selecting frequency bands using band-switching operations to optimize network performance.

BACKGROUND

Multiple gateways may be present within a local area network. For example, a user's home local area network may include a router and a range extending device. Network devices that provide various functionalities may also be present within the local area network. For example, a home automation network device may provide a user with the ability to remotely configure or control one or more electronic devices within and around the user's home using an access device.

A gateway allows client devices (e.g., network devices, access devices, or the like) to access a network by providing wired connections and/or wireless connections using radio frequency channels in one or more frequency bands. The quality of communication that client device can achieve with other devices on the network may be adversely affected by various factors. For example, throughput, latency, and other network characteristics may be affected by interfering signals, contention-free periods, or the like.

BRIEF SUMMARY

Techniques are described for using one or more band-switching operations to optimize network performance. For example, a computing device may receive a communication on a frequency band, and may transmit the communication on a different frequency band. The device, upon receiving the communication on a first frequency band, may determine and/or select a second frequency band on which to transmit the communication.

In some examples, the computing device may be a first gateway that provides network access to one or more access devices, network devices, or the like. For example, the first gateway may be a wireless range extending device, a router, an access point, a network device, an access device, or the like. The first gateway may be connected to a second gateway (e.g., a router, an access point, or the like) that is connected to a wide area network (e.g., the Internet, a cloud network, and/or the like). The second gateway may be setup to be connected to the first gateway with two or more frequency bands. The first gateway may receive a communication from a client device on the network (e.g., an access device, a network device, or the like) on a channel of one of the frequency bands. The first gateway may then determine a different frequency band on which to send the communication to the second gateway. In some embodiments, the device may include a single transceiver radio circuit for each frequency band. In some embodiments, the device may include multiple transceiver radio circuits for each frequency band.

According to at least one example, a computer-implemented method may be provided that includes receiving, on a computing device, a communication, wherein the communication is received on a channel of a first WiFi frequency band, and wherein the communication is received using a first WiFi circuit of the computing device. The method may further include determining a second WiFi frequency band on which to transmit the communication, wherein the second WiFi frequency band is different from the first WiFi frequency band. The method may further include transmitting, from the computing device, the communication, wherein the communication is transmitted on a channel of the second WiFi frequency band, wherein the communication is transmitted using a second WiFi circuit of the computing device, and wherein the determining and transmitting are performed when a band-switching operation is enabled.

In some embodiments, a computing device may be provided that includes one or more data processors, and a first WiFi circuit for receiving a communication, wherein the communication is received on a channel of a first WiFi frequency band. The computing device may further include a non-transitory machine-readable storage medium containing instructions which when executed on the one or more data processors, cause the one or more processors to perform operations including determining a second WiFi frequency band on which to transmit the communication, wherein the second WiFi frequency band is different from the first WiFi frequency band. The computing device may further include a second WiFi circuit for transmitting the communication, wherein the communication is transmitted on a channel of the second WiFi frequency band, and wherein the determining and transmitting are performed when a band-switching operation is enabled.

In some embodiments, a computer-program product tangibly embodied in a non-transitory machine-readable storage medium of a first network device may be provided. The computer-program product may include instructions configured to cause one or more data processors to: receive a communication, wherein the communication is received on a channel of a first WiFi frequency band, and wherein the communication is received using a first WiFi circuit of the computing device; determine a second WiFi frequency band on which to transmit the communication, wherein the second WiFi frequency band is different from the first WiFi frequency band; and transmit the communication, wherein the communication is transmitted on a channel of the second WiFi frequency band, wherein the communication is transmitted using a second WiFi circuit of the computing device, and wherein the determining and transmitting are performed when a band-switching operation is enabled.

In some embodiments, the method, computing device, and computer-program product described above may further include wherein when the first WiFi frequency band includes a 2.4 gigahertz frequency band, the second WiFi frequency band includes a 5 gigahertz frequency band. In some embodiments, when the first WiFi frequency band includes a 5 gigahertz frequency band, the second WiFi frequency band includes a 2.4 gigahertz frequency band.

In some embodiments, the method, computing device, and computer-program product described above may further include determining that both the first WiFi frequency band and the second WiFi frequency band are available, and enabling the band-switching operation upon determining that both the first WiFi frequency band and the second WiFi frequency band are available. In some embodiments, the method, computing device, and computer-program product described above may further include determining that one of the first WiFi frequency band and the second WiFi frequency band has been disabled, and continuing to enable the band-switching operation upon determining that one of the first WiFi frequency band and the second WiFi frequency band has been disabled.

In some embodiments, the method, computing device, and computer-program product described above may further include determining that one of the first WiFi frequency band and the second WiFi frequency band is unavailable, and disabling the band-switching operation upon determining that one the first WiFi frequency band and the second WiFi frequency band is unavailable.

In some embodiments, the method, computing device, and computer-program product described above may further include determining that both the first WiFi frequency band and the second WiFi frequency band are available, and establishing the first WiFi frequency band and the second WiFi frequency band for simultaneous use.

In some embodiments, the computing device includes a wireless range extending device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 6 is a flowchart illustrating an embodiment of a process for selecting one or more frequency bands using band-switching operations, in accordance with some embodiments.

FIG. 7 is a flowchart illustrating another embodiment of a process for selecting one or more frequency bands using band-switching operations, in accordance with some embodiments.

DETAILED DESCRIPTION

Figure 1:
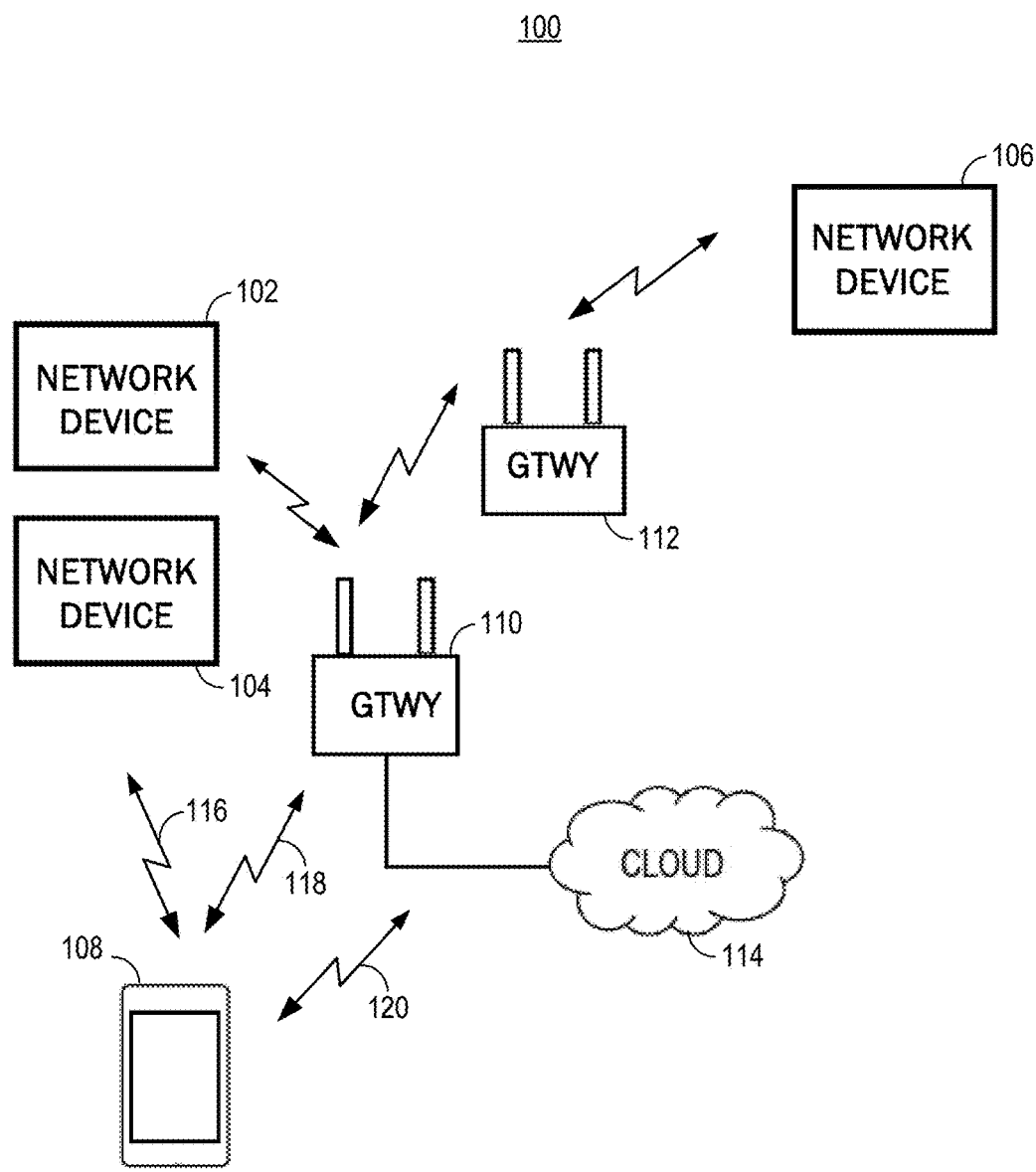
FIG. 1 is an illustration of an example of a wireless network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control one or more electronic devices (e.g., appliances) within an environment that can support the network. For example, an environment can include a home, an office, a business, an automobile, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network. It is also desirable to provide optimal network conditions for devices within the network. As explained herein, techniques and systems are provided that use one or more band-switching operations to optimize network performance.

FIG. 1 illustrates an example of a local area network 100. It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

As illustrated in FIG. 1, the local area network 100 includes network device 102, network device 104, and network device 106. In some embodiments, the network devices 102, 104, 106 may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices such as a home automation network device may be used in other environments, such as a business, a school, an establishment, or any place that can support the local area network 100 to enable communication with network devices. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., a television, a refrigerator, a security system, a game console, a browser, or the like), a speech or gesture interface (e.g., a Kinect™ sensor, a Wiimote™, or the like), an internet of things (IoT) device interface (e.g., an Internet enabled appliance such as a wall switch, a control interface, or the like). While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, infrared (IR), cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. While two gateways 110 and 112 are shown in FIG. 1, one of ordinary skill in the art will appreciate that any number of gateways may be present within the local area network 100.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

Upon being powered on or reset, network devices may be registered with an external network (e.g., cloud network 114) and associated with a logical network within the local area network 100. Details relating to registration of network devices are described below with respect to FIG. 8.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™, Zigbee™, Bluetooth™, infrared (IR), cellular, Long-Term Evolution (LTE), WiMax™, or other wireless communication technologies, or any combination thereof. For example, the WiFi™ protocol is described in the IEEE 802.11 family of standards. Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

Figure 2:
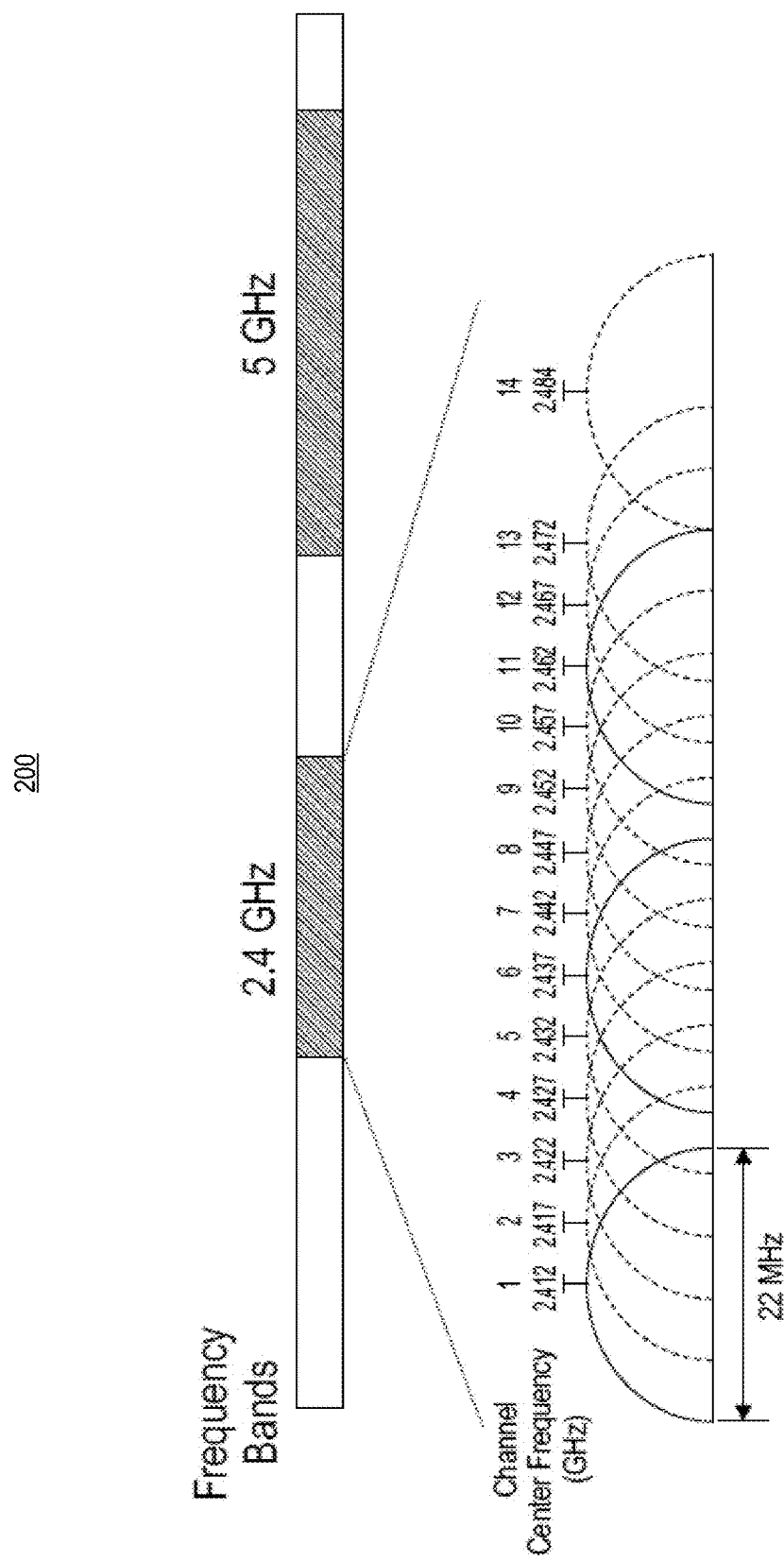
FIG. 2 is an illustration of an example of channels of a frequency band, in accordance with some embodiments.
Figure 3:
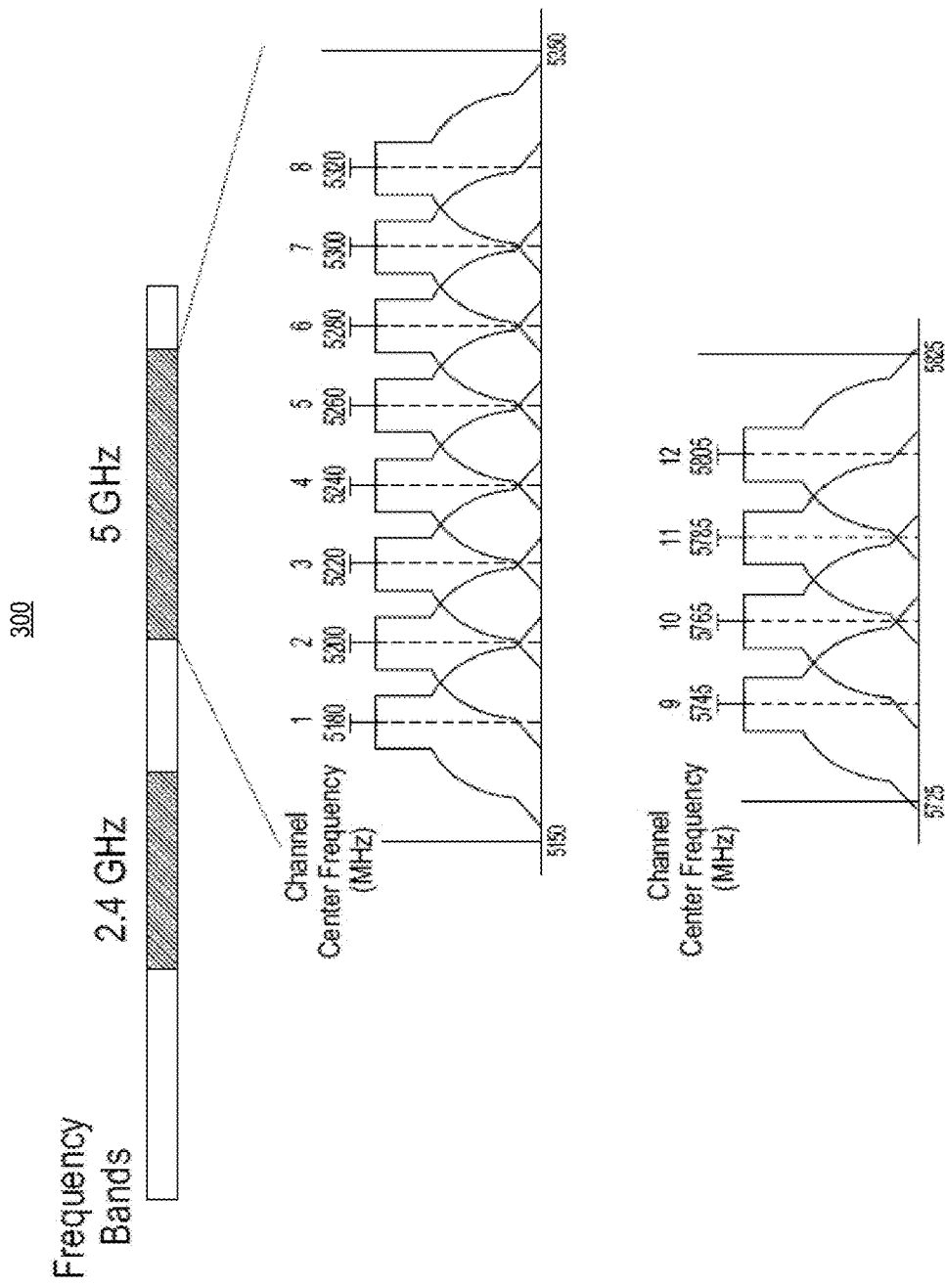
FIG. 3 is an illustration of another example of channels of a frequency band, in accordance with some embodiments.

The network devices 102, 104, 106 and access device 108 can transmit and receive signals using one or more channels of various frequency bands provided by the gateways 108 and/or 110. FIGS. 2 and 3 illustrate examples of channels of different WiFi™ frequency bands available for use in communicating signals in a network.

FIG. 2 illustrates an example of fourteen channels available on a 2.4 gigahertz (GHz) WiFi™ frequency band that spans from 2.412 GHz to 2.484 GHz. Each channel is 22 MHz wide. The channel center of each channel is separated from an adjacent channel center by 5 MHz, with the exception of the spacing between the channel centers of channels 13 and 14, which is 12 MHz. Some or all of the channels may be available for use in a network. For example, channels 1-11 may be available for use in a local area network. As another example, channels 1-13 may be available for use in a network. As yet another example, channels 1-14 may be available for use in a network. One of ordinary skill in the art will appreciate that any combination of the fourteen channels may be available for use in a network. The channels that are available for use may be regulated by the country in which the network is located. Of the fourteen channels of the 2.4 GHz frequency band, three are non-overlapping (non-interfering), including channels 1, 6, and 11.

FIG. 3 illustrates an example of twelve channels available on a 5 GHz WiFi frequency band that spans from 5.180 GHz to 5.805 GHz. The channel center of each channel in the 5 GHz band is separated from an adjacent channel center by 20 MHz. Some or all of the channels may be available for use in a network. For example, channels 1-8 may be available for use in a local area network. As another example, channels 1-12 may be available for use in a network. One of ordinary skill in the art will appreciate that any combination of the twelve channels may be available for use in a network. The channels that are available for use may be regulated by the country in which the network is located.

While FIGS. 2 and 3 illustrate specific examples of frequency bands, one of ordinary skill in the art will appreciate that any available frequency band, including those that are currently in use or that may become available at a future date, may be used to transmit and receive communications according to embodiments described herein. For example, other examples of frequency bands that may be used include a 3.6 GHz frequency band (e.g., from 3.655 GHz to 3.695 GHz), a 4.9 GHz frequency band (e.g., from 4.940 GHz to 4.990 GHz), a 5.9 GHz frequency band (e.g., from 5.850 GHz to 5.925 GHz), or the like. Yet other examples of frequency bands that may be used include tremendously low frequency bands (e.g., less than 3 Hz), extremely low frequency bands (e.g., 3 Hz-30 Hz), super low frequency bands (e.g., 30 Hz-300 Hz), ultra-low frequency bands (e.g., 300 Hz-3000 Hz), very low frequency bands (e.g., 3 KHz-30 KHz), low frequency bands (e.g., 30 KHz-300 KHz), medium frequency bands (e.g., 300 KHz-3000 KHz), high frequency bands (e.g., 3 MHz-30 MHz), very high frequency bands (e.g., 30 MHz-300 MHz), ultra high frequency bands (e.g., 300 MHz-3000 MHz), super high frequency bands (e.g., 3 GHz-30 GHz, including WiFi bands), extremely high frequency bands (e.g., 30 GHz-300 GHz), or terahertz or tremendously high frequency bands (e.g., 300 GHz-3000 GHz).

In some embodiments, a gateway or a client device (e.g., a network device, an access device, or the like) communicating with the gateway may select a particular frequency band to use. Once a band is selected, the gateway or the client device may select one or more channels on which to send and receive communications between the gateway and the client devices. The number of channels that can be used at a given point in time depends on the number of transceiver radio circuits that the gateway includes. For example, if the gateway includes a single transceiver radio circuit for a first frequency band of a particular wireless technology (e.g., a 2.4 GHz WiFi transceiver radio circuit), the gateway can communicate using a single channel from the that frequency band at any given point in time. In some embodiments, a user may configure the gateway to transmit and receive on a particular channel of a particular frequency band selected by the gateway or client device. In some embodiments, the gateway may automatically select a channel based on the quality of the channel. For example, a user may configure the gateway to select, or the gateway may automatically select, channel 1 of the 2.4 GHz band if another gateway in the vicinity of the gateway is using channel 6, since channels 1 and 6 do not overlap. In some embodiments, the gateway may listen for data traffic on other channels, and can switch from one channel to another channel to achieve better reception.

Figure 4:
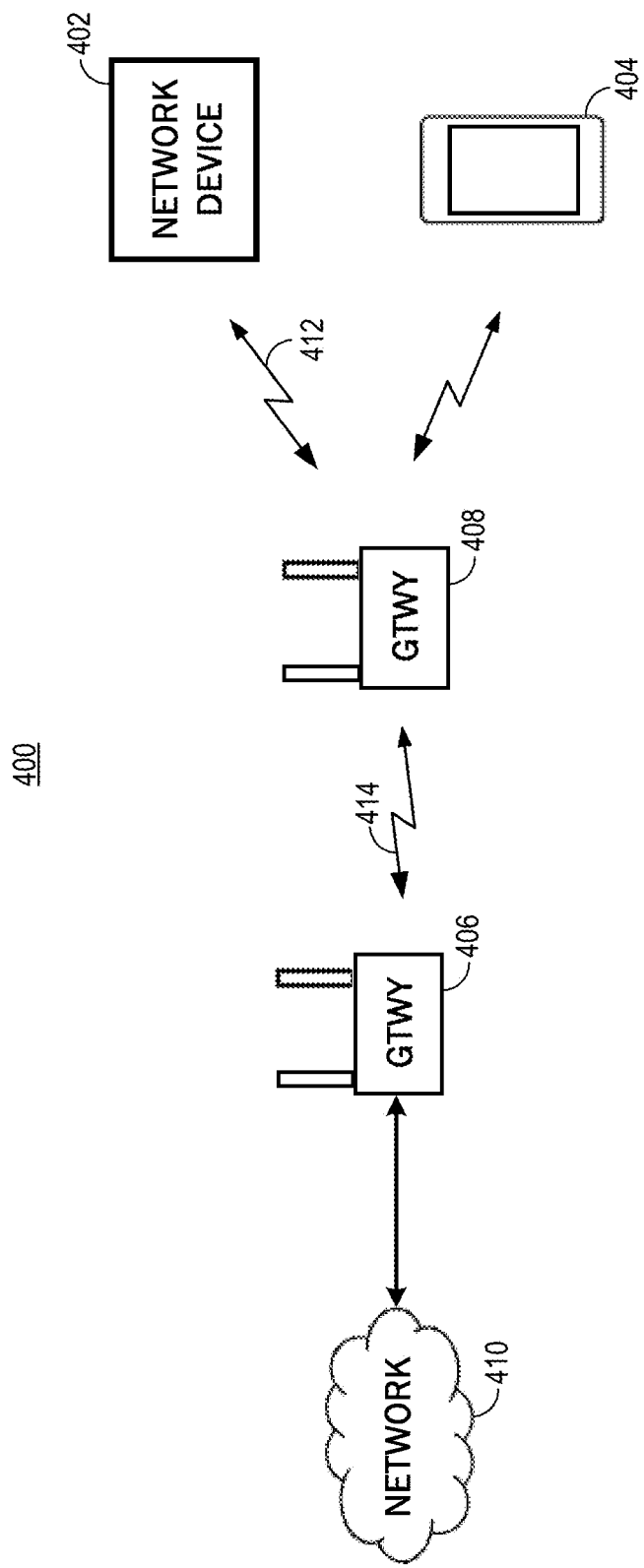
FIG. 4 is an illustration of an example of a wireless network environment, in accordance with some embodiments.
Figure 5:
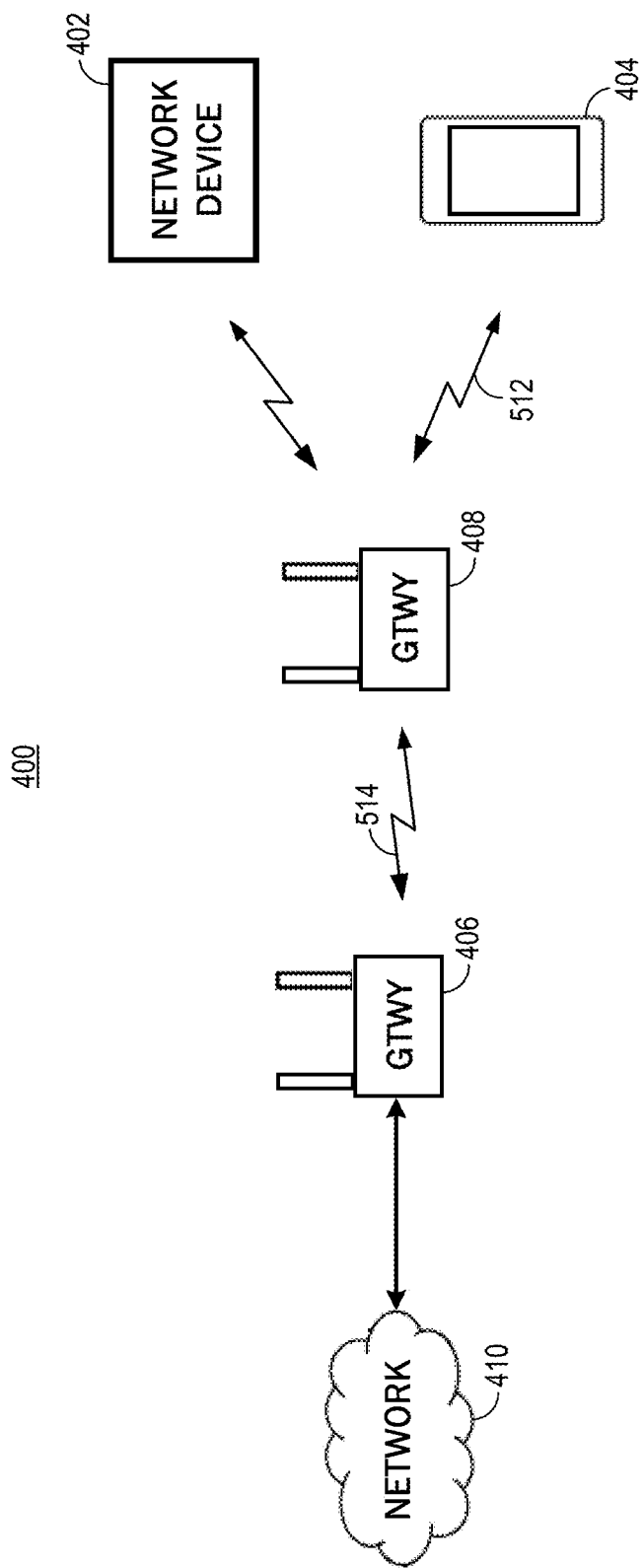
FIG. 5 is an illustration of another example of a wireless network environment, in accordance with some embodiments.

It is desirable to provide a user with good network conditions when communicating on a network. However, conditions may deteriorate as multiple devices connect to the network, as large amounts of data are communicated on the network, or the like. Accordingly, techniques and systems are provided that use one or more band-switching operations to optimize network performance. FIGS. 4-5 illustrate examples of systems in which one or more gateways can perform band-switching operations.

FIG. 4 illustrates an example of a local area network 400 including a gateway 408 that can perform band-switching operations. Similar to the local area network 100 described above, the local area network 400 includes a network device 402, an access device 404, gateways 406, 408, and a network 410. It should be appreciated that the local area network 400 may have other components than those depicted. Further, the embodiment shown in the figure is only one example of a local area network that may incorporate an embodiment of the invention. In some other embodiments, local area network 400 may have more or fewer components than shown in the figure, may combine two or more components, or may have a different configuration or arrangement of components.

In some embodiments, the network device 402 may include a network device that allows a user to access, control, and/or configure various objects located within the user's home, such as those described above with respect to FIG. 1. For example, network device 402 may include a home automation switch that may be coupled with a home appliance. One of ordinary skill in the art will appreciate that the network device 402 may include any other type of device that can be remotely controlled by a user.

Access device 404 may be utilized by a user to wirelessly communicate with the network device 402. The access device 404 may include any human-to-machine interface with network connection capability that allows access to a network, such as a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., a television, a refrigerator, a security system, a game console, a browser, or the like), a speech or gesture interface (e.g., a Kinect™ sensor, a Wiimote™, or the like), an internet of things (IoT) device interface (e.g., an Internet enabled appliance such as a wall switch, a control interface, or the like). The user may interact with the network device 402 using an application, a web browser, a proprietary program, or any other program executed and operated by the access device 404. In some embodiments, the access device 404 may communicate directly with the network device 402. In some embodiments, the access device 404 may communicate with the network device 402 via the gateways 406, 408 and/or the network 410.

While only a single network device 402 and a single access device 404 are shown in FIG. 4, one of ordinary skill in the art will appreciate that multiple network devices and multiple access devices may be connected with the network 400.

Gateway 406 and 408 may provide communication capabilities to network device 402 and access device 404 via radio signals in order to provide communication, location, and/or other services to the devices. While two gateways 406 and 408 are shown in FIG. 4, one of ordinary skill in the art will appreciate that any number of gateways may be present within the local area network 400. The wireless network provided by gateway 406 and gateway 408 may be any type of network familiar to those skilled in the art that can support data communications using any of a variety of commercially-available protocols. For example, gateways 406, 408 may provide wireless communication capabilities for the wireless local area network 400 using particular communications protocols, such as WiFi™ (e.g., IEEE 802.11 family standards), or other mobile communication technologies, or any combination thereof. Using the communications protocol(s), the gateways 406, 408 may provide radio frequencies on which wireless enabled devices in the local area network 400 can communicate.

The gateways 406 and 408 may also provide the access device 404 and the network device 402 with access to one or more external networks, such as the network 410, which may include a cloud network, the Internet, and/or other wide area networks. The network 410 may be similar to the cloud network 114 described with respect to FIG. 1. Gateway 406 is connected to the network 410 (via a wired or wireless connection), and provides the devices on the local area network 400 with access to the network 410.

The gateways 406, 408 may include a router, an access point, a modem, a range extending device, and/or any other device that provides wireless network access among one or more computing devices and/or external networks. For example, gateway 406 may include a router or access point providing the network 400 with access to the external network 410, and gateway 408 may include a range extending device.

The router gateway 406 may include access point and router functionality, and may further include an Ethernet switch and/or a modem. For example, the router gateway 406 may receive and forward data packets among different networks. When a data packet is received, the router gateway 406 may read identification information (e.g., a media access control (MAC) address) in the packet to determine the intended destination for the packet. The router gateway 406 may then access information in a routing table or routing policy, and may direct the packet to the next network or device in the transmission path of the packet. The data packet may be forwarded from one gateway to another through the computer networks until the packet is received at the intended destination.

The range extending gateway 408 may be used to improve signal range and strength within the network 400. For example, the range extending gateway 408 may take an existing signal from the router gateway 406 (or access point) and may rebroadcast the signal to create a second logical network. For example, the range extending gateway 408 may extend the network coverage of the router gateway 406 when two or more devices on the network 400 need to be connected with one another, but the distance is too far for a direct connection to be established. As a result, devices outside of the coverage area of the router gateway 406 may be able to connect through the repeated network provided by the range extending gateway 408. The gateways 406 and 408 may exchange information about destination addresses using a dynamic routing protocol.

In some cases, a gateway may be configured to operate on more than one frequency band. In some embodiments, the gateway may enable band-switching operations upon determining that multiple bands are available for communicating. In some examples, gateway 406 and gateway 408 may operate on multiple bands, including any number of bands across any number of multiple wireless or other transport technologies. For example, gateway 406 and gateway 408 may operate on dual-bands, for example, using both the 2.4 GHz and 5 GHz WiFi bands. In other examples, the gateway 406 and gateway 408 may operate on multiple frequency bands of other transport technologies, such as Bluetooth™ or Zigbee™, including frequency bands that are currently available or that become available in the future. One of ordinary skill in the art will appreciate that any other combination of frequency bands may be used in any wireless or transport technology. In embodiments where the gateway 406 and gateway 408 operate using dual-bands including 2.4 GHz and 5 GHz bands, the range extending gateway 408 may be setup and connected to the router gateway 406 with both 5 GHz and 2.4 GHz bands enabled. For example, a user may configure the router gateway 406 to enable the use of the 5 GHz and 2.4 GHz bands. The range extending gateway 408 may enable band-switching operations upon determining that both the 5 GHz and 2.4 GHz bands are available for communicating with the router gateway 406. For example, once the range extending gateway 408 determines that multiple bands are available, the band-switching operations may be automatically enabled.

In some embodiments, upon determining multiple bands are available between the router gateway 406 and the range extending gateway 408, the range extending gateway 408 may establish two or more bands of the multiple wireless or other transport technologies for simultaneous use, rather than establishing only one of multiple bands at a time. For example, upon determining that both the 5 GHz and 2.4 GHz bands are available for communicating with the router gateway 406, the range extending gateway 408 may establish both the 2.4 GHz and the 5 GHz connections back to the router gateway 406 simultaneously. Accordingly, when both the 2.4 GHz and 5 GHz bands are available, the range extending gateway 408 can pre-establish dual path connections to the router gateway 406 in preparation for either 2.4 GHz and/or 5 GHz client devices to connect and be able to immediately take advantage of the band-switching backbone connection capability.

The router gateway 406 and the range extending gateway 408 may include one or more circuits for each frequency band of a particular technology (e.g., one or more WiFi circuits, Zigbee circuits, Bluetooth circuits, or the like). A WiFi circuit, for example, may include a WiFi transceiver radio and other related circuitry for transmitting and receiving signals on channels of the corresponding frequency band. In some embodiments, the router gateway 406 and/or the range extending gateway 408 may include two or more circuits for each frequency band of a particular technology (e.g., two or more WiFi circuits, Zigbee circuits, Bluetooth circuits, or the like), which may allow the router gateway 406 and/or the range extending gateway 408 to simultaneously transmit and receive communications on the same channel, or simultaneously transmit or receive over different channels of the frequency band. Including multiple circuits for each frequency band of a technology in the router gateway 406 and/or the range extending gateway 408 may increase the cost of the devices to a point that may be unaffordable for an average consumer. For example, including two or more WiFi circuits may unreasonably increase the cost of a range extending gateway.

In some embodiments, in order to provide the router gateway 406 and/or the range extending gateway 408 at a price that is affordable for an average consumer, each of the router gateway 406 and/or the range extending gateway 408 may include a single circuit for each available frequency band of a particular technology. For example, each of the router gateway 406 and/or the range extending gateway 408 may include a single WiFi circuit for the 2.4 GHz frequency band, and a single WiFi circuit for the 5 GHz frequency band. In the event the router gateway 406 and/or the range extending gateway 408 includes a single circuit for a frequency band of a particular technology (e.g., a single WiFi circuit for the 2.4 and a single WiFi circuit for the 5 GHz bands, or the like), the router gateway 406 and/or the range extending gateway 408 can only transmit and receive on a single channel of the frequency band at a time. Furthermore, at a given point in time, the router gateway 406 and/or the range extending gateway 408 can only transmit or receive using the single circuit, but not both transmit and receive at the same time using the single circuit. Accordingly, techniques are needed to provide band-switching functionality for gateways that include a single circuit for each available frequency band of a given wireless or other transport technology (e.g., a single WiFi circuit for each available band), as well as for gateways that include multiple circuits for each frequency band of a given wireless or other transport technology (e.g., multiple WiFi circuits for a given band).

Once band-switching operations are enabled on the range extending gateway 408, the range extending gateway 408 may receive a communication from network device 402 or access device 404 on one frequency band, and may perform the band-switching operations to transmit the communication to the router gateway 406 on a different frequency band. As previously described, the range extending gateway 408 may establish two or more bands of the multiple wireless or other transport technologies for simultaneous use, rather than establishing only one of multiple bands at a time. For example, when multiple bands are available between the router gateway 406 and the range extending gateway 408, the range extending gateway 408 can pre-establish multiple-path connections to the router gateway 406 in preparation for client devices configured to communicate using various frequency bands (e.g., 2.4 GHz and/or 5 GHz bands) to connect and be able to immediately take advantage of the band-switching backbone connection capability between the router gateway 406 and the range extending gateway 408.

The range extending gateway 408 performs a band-switching operation for each client device connection, such as for each network device and access device that communicates with the range extending gateway 408. The client device may determine or select the frequency band on which to send a communication to the range extending gateway 408. In some cases, the client device may be able to operate using only a particular band, and may select that band for communicating with the range extending gateway 408. In some cases, the client device may be configured to operate using multiple bands, and may select a particular frequency band by taking into account various performance factors (e.g., speed, consistency, range, signal strength, round-trip time, or the like) that are present based on where the client device is located relative to the router gateway 406 or range extending gateway 408 at a given point in time. For example, differences in performance factors exist between different frequency bands, such as between a 2.4 GHz frequency band and a 5 GHz frequency band. The 5 GHz frequency band channels, for example, have a lesser chance of picking up interference as compared to channels of the 2.4 GHz frequency band due to more non-overlapping channels existing in the 5 GHz band, and also due to many wireless devices (e.g., Bluetooth devices, cordless phones, microwave ovens, computers, or the like) using the 2.4 GHz frequency, resulting in less interfering signals being present on the 5 GHz band. Further, the higher the frequency for a given band, the shorter the range (the distance signals will cover) is for that frequency band. Accordingly, the 5 GHz frequency band has a shorter range as compared to a 2.4 GHz frequency band. In some cases, the 5 GHz frequency band, at shorter ranges, may have higher bandwidth and throughput data rates as compared to the 2.4 GHz frequency band at the shorter ranges. Taking into account these performance factors, the client device may select a particular frequency band that is most suitable for communicating in the network at a given point in time and location. Based on the selected frequency band used by a particular client device, the range extending gateway 408 can perform the band-switching operations to determine an appropriate frequency band on which to communicate with the router gateway 406 for the particular client device.

In one example, the network device 402 may be connected to the range extending gateway 408 using channel 412 of the 5 GHz WiFi frequency band. Channel 412 may be any of the channels 1-12 described above with respect to FIG. 3. The network device 402 may select channel 412 of the 5 GHz WiFi frequency band, for example, taking into account the various performance factors described above. For example, the network device 402 may be a media player, and may select the 5 GHz band due to the higher possible throughput data rates. The band-switching operation of the range extending gateway 408 may determine that the band that corresponds to the channel 412 is the 5 GHz frequency band. For example, the range extending gateway 408 may receive a communication from the network device 402 over channel 412, and may determine that the channel 412 is of the 5 GHz frequency band. The communication may be received by the range extending gateway 408 using a WiFi circuit configured to transmit and receive communications over the 5 GHz frequency band. In the event the range extending gateway 408 includes a single 5 GHz WiFi circuit, the band-switching operation of the range extending gateway 408 may determine another available WiFi frequency band on which to transmit the communication to the router gateway 406, such as the 2.4 GHz band of the dual bands that are available for communication between the router gateway 406 and the range extending gateway 408. The range extending gateway 408 may then transmit the communication to the router gateway 406 on a channel of the 2.4 GHz band. The communication may be transmitted using a WiFi circuit configured to transmit and receive communications over the 2.4 GHz frequency band.

Referring to FIG. 5, another example of a band-switching operation may be performed by the range extending gateway 408. In this example, the access device 404 may be connected to the range extending gateway 408 using channel 512 of the 2.4 GHz WiFi frequency band, which can be any of the channels 1-14 described above with respect to FIG. 2. The access device 404 may select channel 512 of the 2.4 GHz WiFi frequency band, for example, taking into account the various performance factors described above. For example, the access device 404 may be a laptop computer, and may select the 2.4 GHz band due to the higher ranges that the 2.4 GHz signals can achieve. The band-switching operation of the range extending gateway 408 may determine that the band that corresponds to the channel 512 is the 2.4 GHz frequency band. For example, the range extending gateway 408 may receive a communication from the access device 404 over channel 512, and may determine that the channel 512 is of the 2.4 GHz frequency band. The communication may be received using a WiFi circuit configured to transmit and receive communications over the 2.4 GHz frequency band. The band-switching operation of the range extending gateway 408 may then determine another available WiFi frequency band on which to transmit the communication to the router gateway 406, such as the 5 GHz band of the dual bands that are available for communication between the router gateway 406 and the range extending gateway 408. The range extending gateway 408 may then transmit the communication to the router gateway 406 on a channel of the 5 GHz band. The communication may be transmitted using a WiFi circuit configured to transmit and receive communications over the 5 GHz frequency band.

By using the band-switching operations described above with respect to FIGS. 4 and 5, the range extending gateway 408 can simultaneously transmit and receive communications on different frequencies, even when the range extending gateway 408 includes a single WiFi circuit for each frequency band. As a result, the data throughput for each channel on the client-side (e.g., network and access devices) frequency band is maximized by allowing the use of channels on one or more other frequency bands for communicating with the router gateway 406.

The range extending gateway 408 may further implement various rules to allow the band-switching operations to function efficiently. In some cases, the range extending gateway 408 may determine that the multiple frequency bands are setup and connected between the router gateway 406 and the range extending gateway 408. Upon determining that the multiple frequency bands are available, the range extending gateway 408 may automatically enable band-switching operations without input from a user. For example, upon determining that both the 5 GHz and 2.4 GHz bands are available for communicating with the router gateway 406, the range extending gateway 408 may automatically enable the band-switching operations.

In some cases, another rule that may be implemented by the range extending gateway 408 may include keeping the band-switching operation enabled even in the event one of the multiple frequency bands is disabled or goes down so that only a single frequency band remains. In such cases, the band-switching operation may only be disabled by resetting the range extending gateway 408 to default settings, and then setting up the router gateway 406 to have only a single frequency band connection with the range extending gateway 408. Due to the single frequency band connection, the range extending gateway 408 will not enable the band-switching operation until multiple bands are enabled.

In some cases, the range extending gateway 408 may automatically disable the band-switching operation upon detecting that the frequency bands go from multiple bands to a single band. For example, in the event a band-switching operation is enabled by the range extending gateway 408 upon determining that dual bands are enabled between the range extending gateway 408 and the router gateway 406, but at a later point in time one of the frequency bands goes down or is disabled so that only a single frequency band remains, the range extending gateway 408 may automatically disable the band-switching operation.

In some embodiments, the range extending gateway 408 may automatically enable the band-switching operation if it detects that the throughput on a given channel exceeds a threshold level. For example, a threshold level of the channel being used at a given point in time may be set (e.g., 40%, 45%, 50%, 55%, 60%, 65%, 70%, 75%, or the like). The threshold level may be set taking into account the fact that the band-switching operation may only be beneficial for channels that are experiencing throughput levels above the threshold. As one illustrative example, if the throughput of a channel is less than 50%, the range extending gateway 408 may transmit and receive a communication on the channel without delay. Once the throughput exceeds 50%, for example, the band-switching operation may be implemented in order to prevent delays. Similarly, the range extending gateway 408 may automatically disable the band-switching operation if it detects that the throughput on a channel drops below the threshold level.

In some embodiments, in the event the range extending gateway 408 includes multiple WiFi circuits for each frequency band that is available, the range extending gateway 408 may perform channel-switching operations. For example, a client device (e.g., the network device 402, the access device 404, or the like) may communicate with a first 2.4 GHz WiFi circuit of the range extending gateway 408 using channel 1 of the 2.4 GHz frequency band. The range extending gateway 408 may then use a second 2.4 GHz WiFi circuit to transmit the communication to the router gateway 406 on channel 6 of the 2.4 GHz frequency band. As a result, the full bandwidth of channel 1 can be used for receiving communications from the client device, and the full bandwidth of channel 6 can be used for transmitting communications for that client device to the router gateway 406. The channel-switching operation can be performed individually for each client device so that the channel for transmitting communications of each client device from the range extending gateway 408 is selected based on the channel used by the range extending gateway 408 for receiving communications from each client device.

FIG. 6 illustrates an embodiment of a process 600 for performing one or more band-switching operations. While specific examples may be given of the range extending gateway 408 performing the process 600, one of ordinary skill in the art will appreciate that other devices may perform the process 600, such as a router gateway, a network device, an access device, or the like. In some aspects, the process 600 may be performed by a computing device, such as a gateway 110 or 112, a network device 102, 104, or 106, or an access device 108 shown in FIG. 1, or by a gateway 406 or 408, a network device 402, or access device 404 shown in FIGS. 4-5.

Process 600 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 602, the process 600 includes receiving, on a computing device, a communication, wherein the communication is received on a channel of a first WiFi frequency band, and wherein the communication is received using a first WiFi circuit of the computing device. In some embodiments, the computing device may include a wireless range extending device, such as the range extending gateway 408 described above. In some embodiments, the computing device is part of a home automation network. The communication may be received from a client device (e.g., a network device or access device). The client device may determine or select the first WiFi frequency band based on a configuration of the client device and/or various performance factors, as described above with respect to FIGS. 4 and 5. In some cases, the communication may be received on a channel of the 5 GHz frequency band, similar to the example provided in FIG. 4. In other cases, the communication may be received on a channel of the 2.4 GHz frequency band, similar to the example provided in FIG. 5. In some embodiments, the computing device may determine that multiple bands are available for communicating with another computing device (e.g., a router gateway, an access point, or the like), and may enable a band-switching operation. The band-switching operation of the computing device may determine that the band that corresponds to the channel is the first WiFi frequency band.

At 604, the process 600 includes determining a second WiFi frequency band on which to transmit the communication, wherein the second WiFi frequency band is different from the first WiFi frequency band. At 606, the process 600 includes transmitting, from the computing device, the communication, wherein the communication is transmitted on a channel of the second WiFi frequency band, wherein the communication is transmitted using a second WiFi circuit of the computing device, and wherein the determining and transmitting are performed when a band-switching operation is enabled. The communication may be transmitted to a router gateway (e.g., router gateway 406), an access point, or other device. In some embodiments, when the first WiFi frequency band includes a 5 gigahertz frequency band, the second WiFi frequency band includes a 2.4 gigahertz frequency band. For example, the band-switching operation of the computing device may determine that the first WiFi frequency band is 5 GHz, and in response may select the 2.4 GHz frequency band to transmit the communication to another computing device, similar to the example provided in FIG. 4. In some embodiments, when the first WiFi frequency band includes a 2.4 gigahertz frequency band, the second WiFi frequency band includes a 5 gigahertz frequency band. For example, the band-switching operation of the computing device may determine that the first WiFi frequency band is 2.4 GHz, and in response may select the 5 GHz frequency band to transmit the communication to another computing device, similar to the example provided in FIG. 5.

The first WiFi circuit and the second WiFi circuit may each include a WiFi transceiver radio and other related circuitry for transmitting and receiving signals on channels of the corresponding frequency band. In some embodiments, the computing device may include a single WiFi circuit for the first WiFi frequency band, and a single WiFi circuit for the second WiFi frequency band. The band-switching operation described above allows the computing device to simultaneously transmit and receive communications on different frequencies, even though the computing device may include a single WiFi circuit for each frequency band.

In some embodiments, the computing device includes multiple WiFi circuits for each of the first WiFi frequency band and the second WiFi frequency band. In such embodiments, the computing device may perform channel-switching operations, as described above.

In some embodiments, the process 600 may include determining that both the first WiFi frequency band and the second WiFi frequency band are available, and enabling the band-switching operation upon determining that both the first WiFi frequency band and the second WiFi frequency band are available. For example, the computing device may determine that the first and second WiFi frequency bands are setup and connected between the computing device and another computing device (e.g., between the range extending gateway 408 and the router gateway 406). Upon determining that the frequency bands are available, the computing device may automatically enable band-switching operations without input from a user. In one example, upon determining that both a 5 GHz and a 2.4 GHz band are available for communicating with the other computing device, the computing device may be automatically enable the band-switching operations.

In some embodiments, the process 600 may include determining that one of the first WiFi frequency band and the second WiFi frequency band has been disabled, and continuing to enable the band-switching operation upon determining that one of the first WiFi frequency band and the second WiFi frequency band has been disabled. Accordingly, the computing device may keep the band-switching operation enabled even in the event one of the first or second WiFi frequency bands is disabled or goes down, resulting in one frequency band remaining. In some embodiments, the band-switching operation may only be disabled by resetting the computing device to default settings, and then setting up the other computing device with which the computing device is connected to have only a single frequency band connection with the computing device. Due to the single frequency band connection, the computing device will not enable the band-switching operation until multiple bands are enabled.

In some embodiments, the process 600 may include determining that one of the first WiFi frequency band and the second WiFi frequency band is unavailable, and disabling the band-switching operation upon determining that one the first WiFi frequency band and the second WiFi frequency band is unavailable. In some cases, the computing device may automatically disable the band-switching operation upon detecting that the frequency bands go from multiple bands to a single band. For example, in the event a band-switching operation is enabled by the computing device upon determining that the first and second WiFi frequency bands are available between the computing device and the other computing device with which the computing device is connected, but at a later point in time one of the frequency bands goes down or is disabled so that only a single frequency band remains, the computing device may automatically disable the band-switching operation.

In some embodiments, the process 600 may include determining that both the first WiFi frequency band and the second WiFi frequency band are available, and establishing the first WiFi frequency band and the second WiFi frequency band for simultaneous use. For example, upon determining multiple bands are available between a router gateway and a range extending gateway, a range extending gateway may establish two or more bands of the multiple wireless or other transport technologies for simultaneous use, rather than establishing only one of multiple bands at a time. For example, upon determining that both the 5 GHz and 2.4 GHz bands are available for communicating with the router gateway, the range extending gateway may establish both the 2.4 GHz and the 5 GHz connections back to the router gateway 406 simultaneously.

FIG. 7 illustrates an embodiment of a process 700 for performing one or more band-switching operations. While specific examples may be given of the range extending gateway 408 performing the process 700, one of ordinary skill in the art will appreciate that other devices may perform the process 700, such as a router gateway, a network device, an access device, or the like. In some aspects, the process 700 may be performed by a computing device, such as a gateway 110 or 112, a network device 102, 104, or 106, or an access device 108 shown in FIG. 1, or by a gateway 406 or 408, a network device 402, or access device 404 shown in FIGS. 4-5.

Process 700 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 702, the process 700 includes receiving, on a computing device, a communication, wherein the communication is received on a channel of a first frequency band, and wherein the communication is received using a first circuit of the computing device configured to transmit and receive signals of the first frequency band. For example, the first frequency band may include a frequency band of a first transport technology, such as a Zigbee™ or a Bluetooth™ frequency band, and the first circuit may include a Zigbee™ or Bluetooth™ transceiver radio circuit. In some embodiments, the computing device may include a wireless range extending device, such as the range extending gateway 408 described above. In some embodiments, the computing device is part of a home automation network. The communication may be received from a client device (e.g., a network device or access device). The client device may determine or select the first frequency band based on a configuration of the client device and/or various performance factors, as described above with respect to FIGS. 4 and 5. In some embodiments, the computing device may determine that multiple bands are available for communicating with another computing device (e.g., a router gateway, an access point, or the like), and may enable a band-switching operation. The band-switching operation of the computing device may determine that the band that corresponds to the channel is the first frequency band.

At 704, the process 700 includes determining a second frequency band on which to transmit the communication, wherein the second frequency band is different from the first WiFi frequency band. At 706, the process 700 includes transmitting, from the computing device, the communication, wherein the communication is transmitted on a channel of the second frequency band, wherein the communication is transmitted using a second circuit of the computing device configured to transmit and receive signals of the second frequency band, and wherein the determining and transmitting are performed when a band-switching operation is enabled. The communication may be transmitted to a router gateway (e.g., router gateway 406), an access point, or other device. In some embodiments, the second frequency band and second circuit may be of the same transport technology as the first frequency band and first circuit. For example, the first frequency band may be a 2.4 GHz Bluetooth™ frequency band and the first circuit may be a Bluetooth™ transceiver radio circuit configured to transmit and receive 2.4 GHz Bluetooth™ signals, and the second frequency band may be another Bluetooth™ frequency band and the second circuit may be a Bluetooth™ transceiver radio circuit configured to transmit and receive Bluetooth™ signals at the other Bluetooth™ frequency band. One of ordinary skill in the art will appreciate that the frequency bands and frequency circuits may be of other currently available transport technologies or transport technologies that become available in the future.

The first circuit and the second circuit may each include a transceiver radio and other related circuitry for transmitting and receiving signals on channels of the corresponding frequency band. In some embodiments, the computing device may include a single circuit for the first frequency band, and a single circuit for the second frequency band. The band-switching operation described above allows the computing device to simultaneously transmit and receive communications on different frequencies, even when the computing device includes a single circuit for each frequency band. In some embodiments, the computing device includes multiple circuits for each of the first frequency band and the second frequency band. In such embodiments, the computing device may perform channel-switching operations, as described above.

In some embodiments, the process 700 may include determining that both the first frequency band and the second frequency band are available, and enabling the band-switching operation upon determining that both the first frequency band and the second frequency band are available. For example, the computing device may determine that the first and second frequency bands are setup and connected between the computing device and another computing device (e.g., between the range extending gateway 408 and the router gateway 406). Upon determining that the frequency bands are available, the computing device may automatically enable band-switching operations without input from a user.

In some embodiments, the process 700 may include determining that one of the first frequency band and the second frequency band has been disabled, and continuing to enable the band-switching operation upon determining that one of the first frequency band and the second frequency band has been disabled. Accordingly, the computing device may keep the band-switching operation enabled even in the event one of the first or second frequency bands is disabled or goes down, resulting in one frequency band remaining. In some embodiments, the band-switching operation may only be disabled by resetting the computing device to default settings, and then setting up the other computing device with which the computing device is connected to have only a single frequency band connection with the computing device. Due to the single frequency band connection, the computing device will not enable the band-switching operation until multiple bands are enabled.

In some embodiments, the process 700 may include determining that one of the first frequency band and the second frequency band is unavailable, and disabling the band-switching operation upon determining that one the first frequency band and the second frequency band is unavailable. In some cases, the computing device may automatically disable the band-switching operation upon detecting that the frequency bands go from multiple bands to a single band. For example, in the event a band-switching operation is enabled by the computing device upon determining that the first and second frequency bands are available between the computing device and the other computing device with which the computing device is connected, but at a later point in time one of the frequency bands goes down or is disabled so that only a single frequency band remains, the computing device may automatically disable the band-switching operation.

In some embodiments, the process 700 may include determining that both the first frequency band and the second frequency band are available, and establishing the first frequency band and the second frequency band for simultaneous use. For example, upon determining multiple bands are available between a router gateway and a range extending gateway, a range extending gateway may establish two or more bands of the multiple wireless or other transport technologies for simultaneous use, rather than establishing only one of multiple bands at a time.

While the description herein discusses specific examples of band-switching and channel-switching operations using WiFi, Bluetooth™, or Zigbee™ frequency bands, one of ordinary skill in the art will appreciate that band-switching and channel-switching operations can be performed on other frequency bands, including those that are currently in use or that may become available at a future date. For example, other frequencies for which band-switching and channel-switching operations may be used include tremendously low frequency bands (e.g., less than 3 Hz), extremely low frequency bands (e.g., 3 Hz-30 Hz), super low frequency bands (e.g., 30 Hz-300 Hz), ultra-low frequency bands (e.g., 300 Hz-3000 Hz), very low frequency bands (e.g., 3 KHz-30 KHz), low frequency bands (e.g., 30 KHz-300 KHz), medium frequency bands (e.g., 300 KHz-3000 KHz), high frequency bands (e.g., 3 MHz-30 MHz), very high frequency bands (e.g., 30 MHz-300 MHz), ultra high frequency bands (e.g., 300 MHz-3000 MHz), super high frequency bands (e.g., 3 GHz-30 GHz, including WiFi bands), extremely high frequency bands (e.g., 30 GHz-300 GHz), or terahertz or tremendously high frequency bands (e.g., 300 GHz-3000 GHz). Other examples of frequency bands that may be used include a 3.6 GHz frequency band (e.g., from 3.655 GHz to 3.695 GHz), a 4.9 GHz frequency band (e.g., from 4.940 GHz to 4.990 GHz), a 5.9 GHz frequency band (e.g., from 5.850 GHz to 5.925 GHz), a 868 MHz frequency band, a 915 MHz frequency band, a 2.4 GHz frequency band for Bluetooth™ or Zigbee™ technologies, or the like.

For example, the network device 402 illustrated in FIG. 4 may be connected to the range extending gateway 408 using a 915 MHz frequency band. The band-switching operation of the range extending gateway 408 may determine that the band that corresponds to the channel on the 915 MHz frequency band, and may determine another available frequency band on which to transmit the communication to the router gateway 406. For example, the band-switching operation may determine that the 868 MHz band was pre-established and is available for communication between the router gateway 406 and the range extending gateway 408. The range extending gateway 408 may then transmit the communication to the router gateway 406 on a channel of the 868 MHz band, for example, using a circuit configured to transmit and receive communications over the 868 MHz frequency band. One of ordinary skill in the art will appreciate that any combination of the above frequency bands and channels, or any other available frequency bands and channels, can be used in the band-switching and channel-switching operations described herein.

Figure 8:
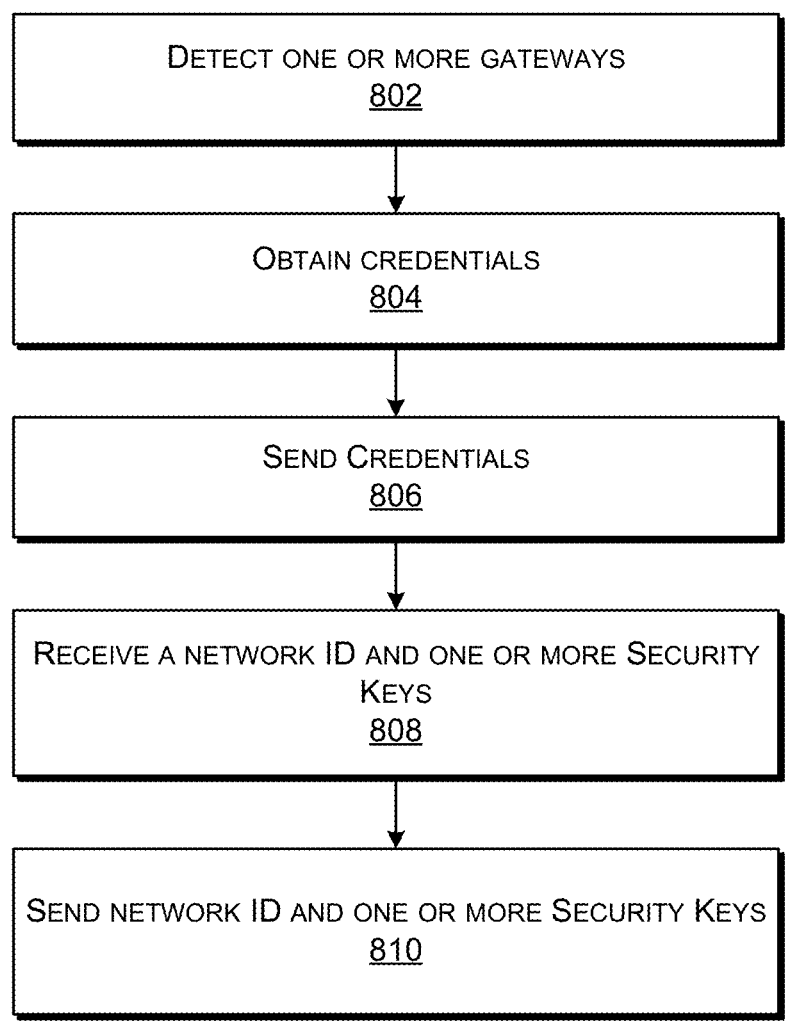
FIG. 8 is a flowchart illustrating an embodiment of a process for registering one or more network devices, in accordance with some embodiments.

As noted above in the description of FIG. 1, network devices, upon being powered on or reset, may be registered with a network (e.g., a cloud network) and associated with a logical network within a local area network. FIG. 8 illustrates an example of a process 800 for registering one or more network devices, such as the network devices 102, 104, 106 illustrated in FIG. 1, or the network device 402 illustrated in FIGS. 4 and 5. When multiple network devices and gateways are included within a local area network, the network devices and/or gateways may be installed at different times, resulting in the techniques described with respect to FIG. 8 possibly occurring for each network device and/or gateway at different points in time. For example, referring to FIG. 1, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 802, a network device may detect one or more gateways upon being powered on or reset. In some embodiments, a provisioning process may occur when the network device is powered on or reset and detected by an access device (e.g., access device 108, 402, and/or 404). During the provisioning process, the access device may directly communicate with the network device. In some embodiments, direct communication between network devices and an access device may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 804, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 806. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 808, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 810, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1 (PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime= Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign= UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device may access the network devices locally via a gateway (e.g., gateway using communication signal 118) or remotely via the cloud network (e.g., cloud network 114 using communication signal 120). In some embodiments, the communication between the access device and the cloud network may be a HTTP or HTTPS communication. One of ordinary skill in the art will appreciate that other communication mechanisms may be used to communicate between the access device and the cloud network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like), as described above with respect to FIG. 8. For example, as described above, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

Figure 9:
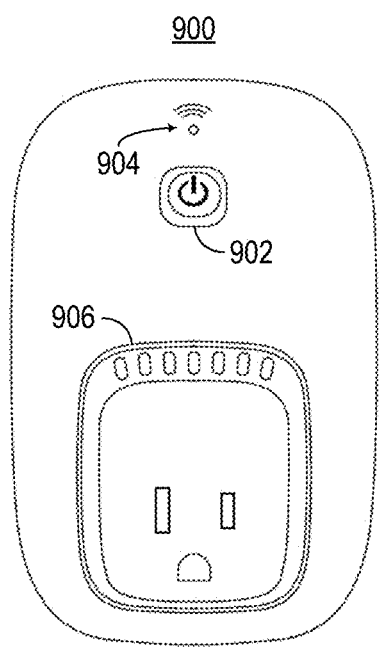
FIG. 9 is an illustration of an example of a front view of a network device, in accordance with an embodiment.
Figure 10:
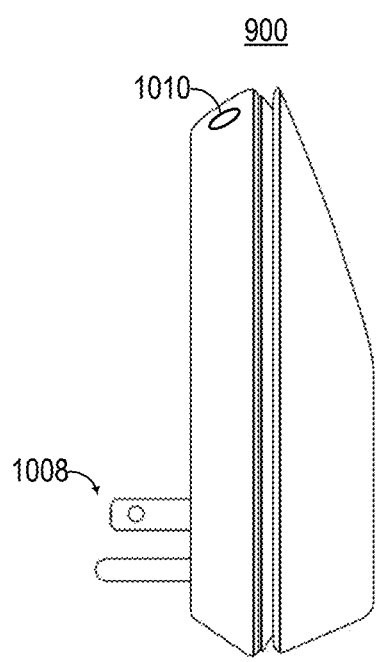
FIG. 10 is an illustration of an example of a side view of a network device, in accordance with an embodiment.

FIG. 9 illustrates an example of a front view of a network device 900. FIG. 10 illustrates an example of a side view of the network device 900. The network device 900 may include any of the network devices 102, 104, or 106 described herein. In some embodiments, the network device 900 may be a home automation network device. For example, the network device 900 may include a home automation switch that may be coupled with a home appliance. A user may wirelessly access the network device 900 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 900 may include a WiFi enabled switch that connects home appliances and other electronic devices to a compatible 802.11b/g/n/ac WiFi network. The network device 900 may thus allow users to locally or remotely turn devices on or off from anywhere, program customized notifications, and/or change device status. The network device 900 may further allow a user to create custom schedules or have devices respond to sunrise or sunset.

The network device 900 includes an power switch 902 that may be depressed in order to turn the network device 900 on and off. In some embodiments, a light source may be integrated with or located behind the power switch. For example, a light-emitting diode (LED) may be located on a circuit board under the power button 902. The light source may be illuminated when the network device 900 is powered on, and may not be illuminated when the network device 900 is powered off.

The network device 900 further includes a communications signal indicator 904. The signal indicator 904 may indicate whether the network device 900 has access to a communications signal, such as a WiFi signal. For example, the signal indicator 904 may include a light source (e.g., a LED) that illuminates when the network device 900 is connected to a communications signal. The light source may depict different colors or other characteristics (e.g., flashing, dimming, or the like) to indicate different levels of signal strength or mode of operation.

The network device 900 includes a restore button 1010. The restore button 1010 may allow a user to reset the network device 900 to factory default settings. For example, upon being depressed, the restore button 1010 may cause all software on the device to be reset to the settings that the network device 900 included when purchased from the manufacturer.

The network device 900 further includes a plug 1008 and an outlet 906. The plug 1008 allows the network device 900 to be plugged into a wall socket, such as a socket providing 120V, 220V, or the like. In turn, an appliance may be plugged into the outlet 906. Once the network device 900 is registered according to the techniques described above, an appliance plugged into the socket 906 may be controlled by a user using an access device (e.g., access device 108).

Figure 11:
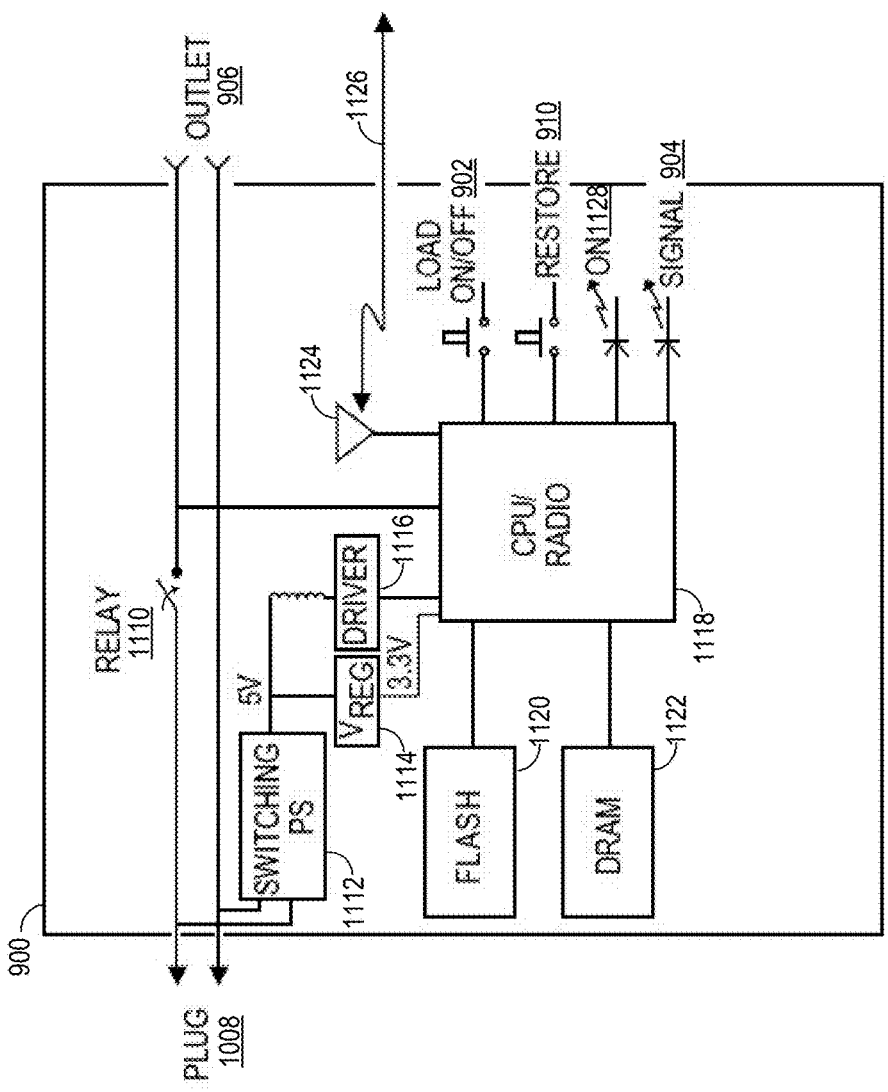
FIG. 11 is an example of a block diagram of a network device, in accordance with an embodiment.

FIG. 11 is an example of a block diagram of the network device 900 depicting different hardware and/or software components of the network device 900. As described above with respect to FIGS. 9 and 10, the network device 900 includes the outlet 906, the plug 1008, the power button 902, the restore button 1010, and the communications signal indicator 904. The network device 900 also includes light source 1128 associated with the power button 902. As previously described, the light source 1128 may be illuminated when the network device 900 is powered on.

The network device 900 further includes a relay 1110. The relay 1110 is a switch that controls whether power is relayed from the plug 1008 to the outlet 906. The relay 1110 may be controlled either manually using the power button 902 or remotely using wireless communication signals. For example, when the power button 902 is in an ON position, the relay 1110 may be closed so that power is relayed from the plug 1008 to the outlet 906. When the power button 902 is in an OFF position, the relay 1110 may be opened so that current is unable to flow from the plug 1008 to the outlet 906. As another example, an application or program running on an access device may transmit a signal that causes the relay 1110 to be opened or closed. For instance, an access application may display a graphical interface on the access device that includes a power button. The user may tap or otherwise select the power button, and the access application may send a communication signal (e.g., over a WiFi network) to the network device 900 instructing the network device 900 to open or close the relay 1110.

The network device 900 further includes flash memory 1120 and dynamic random access memory (DRAM) 1122. The flash memory 1120 may be used to store instructions or code relating to an operating system, one or more applications, and any firmware. The flash memory 1120 may include nonvolatile memory so that any firmware or other program can be can updated. In the event the network device 900 loses power, information stored in the flash memory 1120 may be retained. The DRAM 1122 may store various other types of information needed to run the network device 900, such as all runtime instructions or code.

The network device 900 further includes a CPU/Radio 1118. The CPU/Radio 1118 controls the operations of the network device 900. For example, the CPU/Radio 1118 may execute various applications or programs stored in the flash memory 1120 and/or the dynamic random access memory (DRAM) 1122. The CPU/Radio 1118 may also receive input from the various hardware and software components, interpret the input, and perform one or more functions in response to the input. As one example, the CPU/Radio 1118 may determine whether the power button 902 has been pressed, and determines whether the relay 1110 needs to be opened or closed. The CPU/Radio 1118 may further perform all communications functions in order to allow the network device 900 to communicate with other network devices, one or more gateways, a cloud network, and/or one or more access devices. While the CPU and radio of the network device 900 are shown to be combined in the CPU/Radio 1118, one of ordinary skill in the art will appreciate that, in some embodiments, the CPU and radio may be separately located within the network device 900. For example, CPU circuitry may be situated at a separate location on a circuit board from the location of radio circuitry, the CPU circuitry may be located on a different circuit board from the radio circuitry, or the like.

The network device 900 may communicate with other devices and/or networks via antenna 1124. For example, antenna 1124 may include a 2.4 GHz antenna, a 5 GHz antenna, or the like, that can transmit and receive WiFi communications signals. The antenna 1124 may include other types of antennas that can communicate Bluetooth® signals, Zigbee® signals, Ultra-Wideband (UWB) signals, and/or the like. In some embodiments, the network device 900 may include multiple antennas for communicating different types of communication signals. As one example, the network device 900 may include both a 2.4 GHz antenna and a 5 GHz antenna.

The network device 900 further includes a driver 1116, a switching power supply 1112, and a voltage regulator 1114. The driver 1116 may include instructions or code that can be used to translate control signals or commands received from applications running on the DRAM 1122 to commands that the various hardware components in the network device 900 can understand. In some embodiments, the driver 1116 may include an ambient application running on the DRAM 1122. The switching power supply 1112 may be used to transfer power from the outlet in which the plug 1008 is connected to the various loads of the network device 900 (e.g., CPU/Radio 1118). The switching power supply 1112 may efficiently convert the voltage and current characteristics of the electrical power to a level that is appropriate for the components of the network device 900. For example, the switching power supply 1112 may perform AC-DC conversion. In some embodiments, the switching power supply 1112 may be used to control the power that is relayed from the plug 1008 to the outlet 906. The voltage regulator 1114 may be used to convert the voltage output from the switching power supply 1112 to a lower voltage usable by the CPU/Radio 1118. For example, the voltage regulator 1114 may regulate the DC voltage from 5V to 3.3V.

In various embodiments, functions may be stored as one or more computer-program products, such as instructions or code, in a non-transitory machine-readable storage medium, such as the flash memory 1120 and/or the DRAM 1122. The network device 900 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 6, 7, or 8, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 6, 7, or 8. The memory, such as the flash memory 1120 and/or the DRAM 1122, may be a processor-readable memory and/or a computer-readable memory that stores software code (programming code, instructions, etc.) configured to cause a processor(s) within the CPU/Radio 1118 to perform the functions described. In other embodiments, one or more of the functions described may be performed in hardware.

A set of these instructions and/or code might be stored on a non-transitory machine-readable storage medium, such as the flash memory 1120 and/or the DRAM 1122. In some cases, the storage medium might be incorporated within a computer system, such as the CPU/Radio 1118. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 900 and/or might take the form of source and/or installable code, which, upon compilation and/or installation on the network device 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 900 may have other components than those depicted in FIGS. 8-11. Further, the embodiment shown in the figures are only one example of a network device that may incorporate an embodiment of the invention. In some other embodiments, network device 900 may have more or fewer components than shown in the figure, may combine two or more components, or may have a different configuration or arrangement of components.

Figure 12:
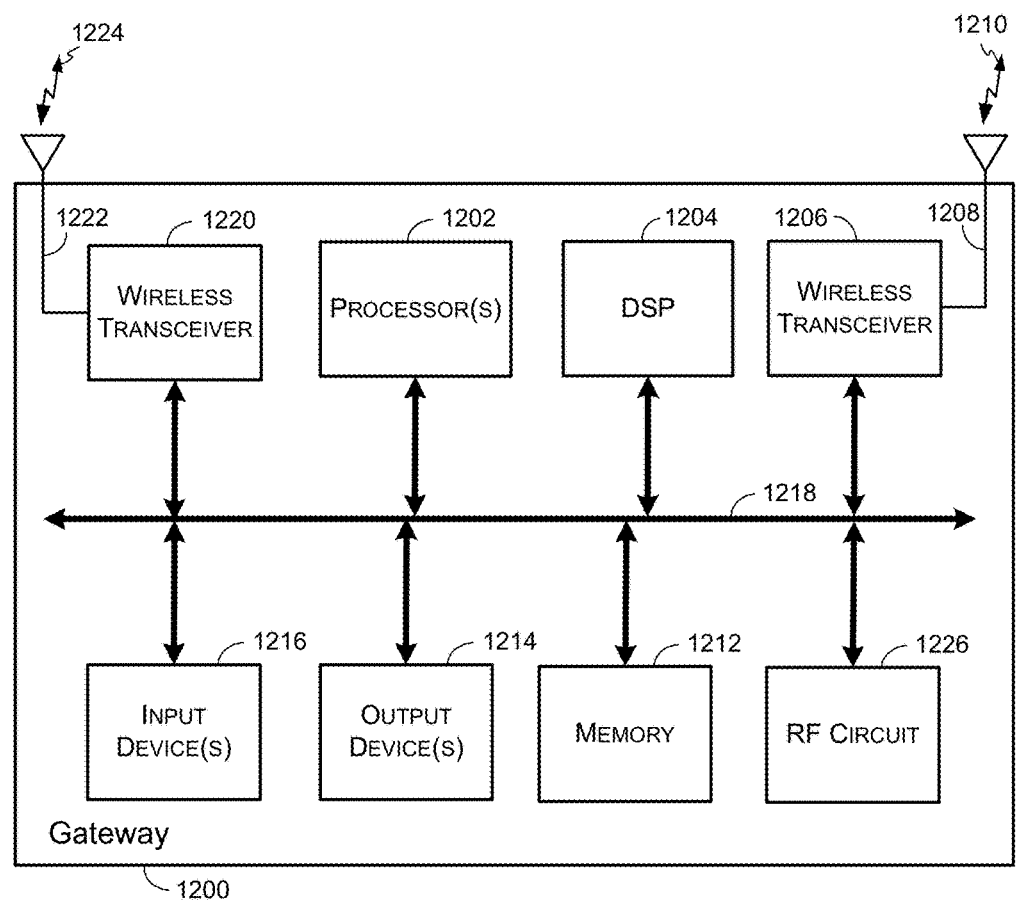
FIG. 12 is a block diagram illustrating an example of a gateway, in accordance with some embodiments.

FIG. 12 illustrates an example of a gateway 1200. The gateway 1200 may include a range extending device, a router, an access point, a modem, and/or any other device that provides network access among one or more computing devices and/or external networks. For example, the gateway 1200 may include a router gateway with access point and router functionality, and may further include an Ethernet switch and/or a modem. As another example, the gateway 1200 may include a range extending gateway that may be used to improve signal range and strength within a network by taking an existing signal from another gateway (e.g., a router gateway, an access point, or the like) and rebroadcasting the signal to create a second logical network.

The gateway 1200 includes hardware elements that can be electrically coupled via a bus 1218 (or may otherwise be in communication, as appropriate). In one embodiment, the bus 1218 can be used for the processor(s) 1202 to communicate between cores and/or with the memory 1212. The hardware elements may include one or more processors 1202, including without limitation one or more general-purpose processors and/or one or more special-purpose processors (such as digital signal processing chips, graphics acceleration processors, and/or the like); one or more input devices 1216, which can include without limitation one or more buttons, a keyboard, a keypad, a touch sensitive screen, a touch pad, and/or the like; and one or more output devices 1214, which can include, without limitation, a display, light or sound indicators, and/or the like.

The gateway 1200 may include one or more wireless transceivers 1206 and 1220 connected to the bus 1218. The wireless transceiver 1206 may be operable to receive wireless signals (e.g., a wireless signal 1210) via an antenna 1208. The wireless transceiver 1220 may be operable to receive wireless signals (e.g., a wireless signal 1214) via an antenna 1222. The wireless transceivers 1206 and 1220 may each include a WiFi transceiver radio designed to transmit and receive signals using frequencies of a specific frequency band, which may be referred to herein as "WiFi circuits." For example, wireless transceiver 1206 may include a 2.4 GHz WiFi circuit, and wireless transceiver 1220 may include a 5 GHz WiFi circuit. Accordingly, the gateway 1200 may include a single WiFi circuit for a first WiFi frequency band, and a single WiFi circuit for a second WiFi frequency band. In some embodiments, the gateway 1200 may include multiple wireless transceivers (not shown) for each available frequency band. The antennas 1208 and 1222 may include multiple band antennas that can transmit and/or receive signals over different frequency bands.

The gateway 1200 may further include radio frequency (RF) circuit 1226. In some embodiments, the wireless transceivers 1206 and 1220 may be integrated with or coupled to the RF circuit 1226 so that the RF circuit 1226 includes the wireless transceivers 1206 and 1220. In some embodiments, the wireless transceivers 1206 and 1220 and the RF circuit 1226 are separate components. The RF circuit 1226 may include a RF amplifier that may amplify signals received over antennas 1208 and 1222. The RF circuit 1226 may also include a power controller that may be used to adjust signal amplification by the RF amplifier. The power controller may be implemented using hardware, firmware, software, or any combination thereof.

The wireless signals 1210 and 1224 may be transmitted via a wireless network. In some embodiments, the wireless network may be any wireless network such as a wireless local area network (e.g., local area network 100), such as WiFi™, a Personal Access Network (PAN), such as Bluetooth® or Zigbee®, or a cellular network (e.g. a GSM, WCDMA, LTE, CDMA2000 network). Wireless transceivers 1206 and 1220 may be configured to receive various radio frequency (RF) signals (e.g., signals 1210 and 1224) via antennas 1208 and 1224, respectively, from one or more other gateways, access devices, network devices, cloud networks, and/or the like. Gateway 1200 may also be configured to decode and/or decrypt, via the DSP 1204 and/or processor(s) 1202, various signals received from one or more gateways, network devices, cloud networks, and/or the like.

The gateway 1200 may include a power supply (not shown) that can power the various components of the gateway 1200. The power supply may include a switch-mode power supply, a linear power supply, a push-pull power supply, or any other suitable type of power supply. In some embodiments, the gateway 1200 may include multiple power supplies. For example, a switch-mode power supply may be used to condition input power, and a linear power supply may be used to power the RF circuit 1226. The power supply may be configured to operate over various ranges of appropriate input voltages.

The gateway 1200 may further include (and/or be in communication with) one or more non-transitory machine-readable storage mediums or storage devices (e.g., memory 1212), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1212, such as RAM, ROM, FLASH, or disc drive, and executed by processor(s) 1202 or DSP 1204. The gateway 1200 can also comprise software elements (e.g., located within the memory 1212), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 6 and/or 7, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 6 and/or 7. The memory 1212 may be a non-transitory machine-readable storage medium, processor-readable memory, and/or a computer-readable memory that stores the one or more computer-program products configured to cause the processor(s) 1202 to perform the functions described. In other embodiments, one or more of the functions described may be performed in hardware.

A set of these instructions and/or code might be stored on a non-transitory machine-readable storage medium, such as the memory 1212. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1200 and/or might take the form of source and/or installable code, which, upon compilation and/or installation on the gateway 1200 (e.g., using any of a variety of generally available compilers, installation programs, compression/decompression utilities, etc.) then takes the form of executable code.

Figure 13:
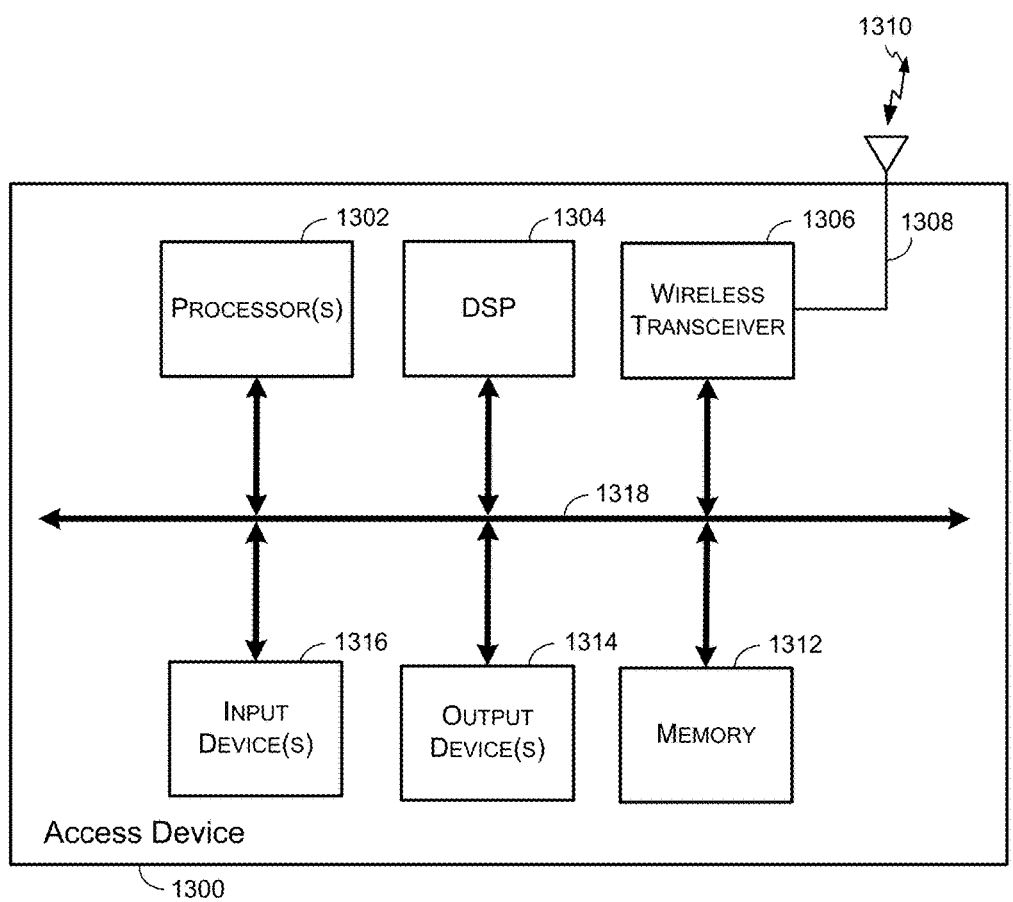
FIG. 13 is a block diagram illustrating an example of an access device, in accordance with some embodiments.

FIG. 13 illustrates an example of an access device 1300. The access device 1300 may include any human-to-machine interface with network connection capability that allows access to a network. For example, the access device 1300 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Km™ ect sensor, Wiimote™, or the like), an internet of things (IoT) device interface (e.g., an Internet enabled appliance such as a wall switch, a control interface, or the like). The access device 1300 includes hardware elements that can be electrically coupled via a bus 1318 (or may otherwise be in communication, as appropriate). In one embodiment, the bus 1318 can be used for the processor(s) 1302 to communicate between cores and/or with the memory 1312. The hardware elements may include one or more processors 1302, including without limitation one or more general-purpose processors and/or one or more special-purpose processors (such as digital signal processing chips, graphics acceleration processors, and/or the like); one or more input devices 1316, which can include without limitation a camera, a mouse, a keyboard, a touch sensitive screen, a touch pad, a keypad, and/or the like; and one or more output devices 1314, which can include, without limitation, a display, a printer, and/or the like.

The access device 1300 may include one or more wireless transceivers 1306 connected to the bus 1318. The wireless transceiver 1306 may be operable to receive wireless signals via antenna 1308 (e.g., signal 1310). The wireless signal 1310 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 1306 may be configured to receive various radio frequency (RF) signals (e.g., signal 1310) via antenna 1308 from one or more gateways, network devices, other access devices, cloud networks, and/or the like. Access device 1300 may also be configured to decode and/or decrypt, via the DSP 1304 and/or processor(s) 1302, various signals received from one or more gateways, network devices, other access devices, cloud networks, and/or the like.

The access device 1300 may further include (and/or be in communication with) one or more non-transitory machine-readable storage mediums or storage devices (e.g., memory 1312), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1312, such as RAM, ROM, FLASH, or disc drive, and executed by processor(s) 1302 or DSP 1304. The access device 1300 can also comprise software elements (e.g., located within the memory 1312), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 6 and/or 7, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 6 and/or 7. The memory 1312 may be a non-transitory machine-readable storage medium, processor-readable memory, and/or a computer-readable memory that stores the one or more computer-program products configured to cause the processor(s) 1302 to perform the functions described. In other embodiments, one or more of the functions described may be performed in hardware.

A set of these instructions and/or code might be stored on a non-transitory machine-readable storage medium, such as the memory 1312. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the access device 1300 and/or might take the form of source and/or installable code, which, upon compilation and/or installation on the access device 1300 (e.g., using any of a variety of generally available compilers, installation programs, compression/decompression utilities, etc.) then takes the form of executable code.

Figure 14:
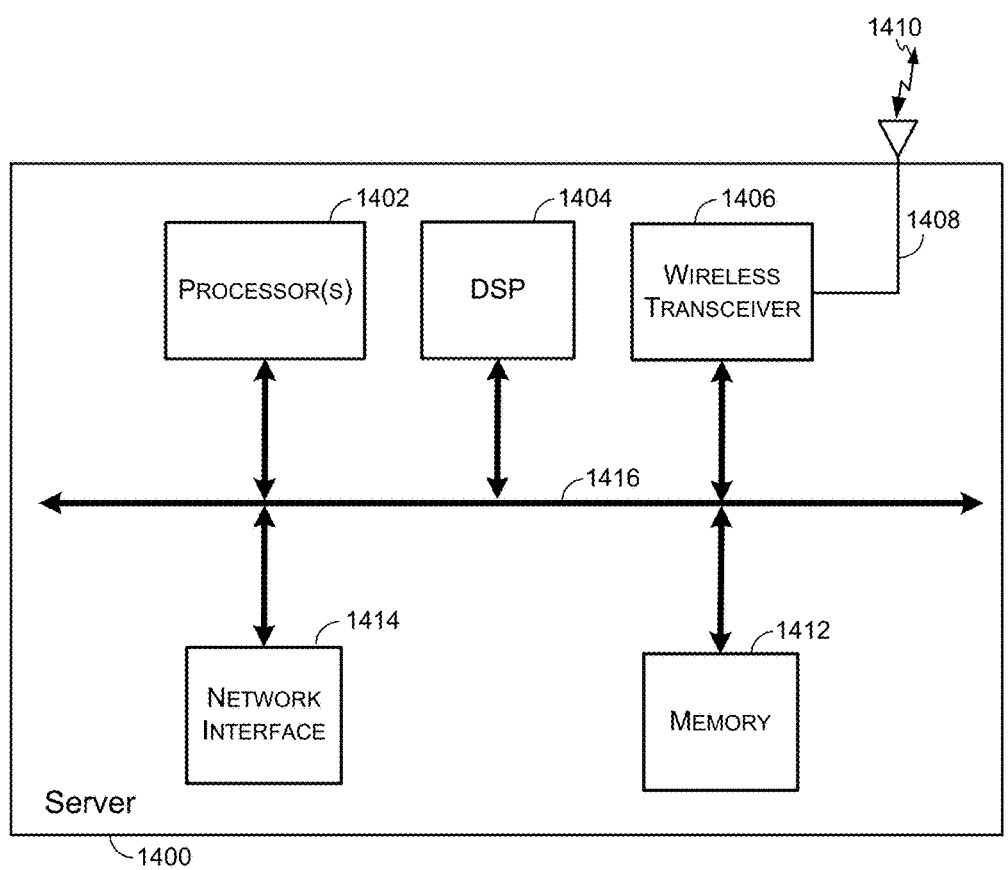
FIG. 14 is a block diagram illustrating an example of a server, in accordance with some embodiments.

FIG. 14 illustrates an example of a server 1400. The server 1400 includes hardware elements that can be electrically coupled via a bus 1416 (or may otherwise be in communication, as appropriate). In one embodiment, the bus 1416 can be used for the processor(s) 1402 to communicate between cores and/or with the memory 1412. The hardware elements may include one or more processors 1402, including without limitation one or more general-purpose processors and/or one or more special-purpose processors (such as digital signal processing chips, graphics acceleration processors, and/or the like), memory 1412, DSP 1404, a wireless transceiver 1406, a bus 1416, and antenna 1408. Furthermore, in addition to the wireless transceiver 1406, server 1400 can further include a network interface 1414 to communicate with a network (e.g., a local area network, a network of a preferred carrier, Internet, etc.).

The server 1400 may further include (and/or be in communication with) one or more non-transitory machine-readable storage mediums or storage devices (e.g., memory 1412), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1412. The server 1400 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement various methods and/or configure various systems. The memory 1412 may be a non-transitory machine-readable storage medium, processor-readable memory, and/or a computer-readable memory that stores the one or more computer-program products configured to cause the processor(s) 1402 to perform the various functions. In other embodiments, one or more functions may be performed in hardware.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
receiving, on a computing device, a communication, wherein the communication is received on a channel of a first WiFi frequency band, and wherein the communication is received using a first WiFi circuit of the computing device;
determining both the first WiFi frequency band and a second WiFi frequency band are available for communication by the computing device, wherein the second WiFi frequency band is different from the first WiFi frequency band;
monitoring a throughput of the channel of the first WiFi frequency band, wherein the throughput of the channel includes a percentage of a maximum capacity of the channel;
comparing the throughput of the channel of the first WiFi frequency band to a throughput threshold level;
determining the throughput of the channel of the first WiFi frequency band is above the throughput threshold level;
automatically enabling a band-switching operation when both the first WiFi frequency band and the second WiFi frequency band are determined to be available and when the throughput of the channel of the first WiFi frequency band is determined to be above the throughput threshold level, wherein the band-switching operation is automatically disabled when the throughput of the channel of the first WiFi frequency band is determined to be below the throughput threshold level;

switching from the first WiFi frequency band to the second WiFi frequency band for transmitting the communication, wherein switching is performed when the band-switching operation is enabled, and wherein the switching enables the computing device to simultaneously receive communications on a channel of the first Wifi frequency band and transmit communications on a channel of the second WiFi frequency band; and transmitting, from the computing device, the communication, wherein the communication is transmitted using a second WiFi circuit of the computing device on a channel of the second WiFi frequency band, and wherein the computing device is configured to transmit the communication while simultaneously receiving communications on the channel of the first Wifi frequency band.

2. The method of claim 1, wherein when the first WiFi frequency band includes a 2.4 gigahertz frequency band, the second WiFi frequency band includes a 5 gigahertz frequency band.

3. The method of claim 1, wherein when the first WiFi frequency band includes a 5 gigahertz frequency band, the second WiFi frequency band includes a 2.4 gigahertz frequency band.

4. The method of claim 1, further comprising:
determining that one of the first WiFi frequency band and the second WiFi frequency band has been disabled; and
continuing to enable the band-switching operation upon determining that one of the first WiFi frequency band and the second WiFi frequency band has been disabled.

5. The method of claim 1, further comprising:
determining that one of the first WiFi frequency band and the second WiFi frequency band is unavailable; and
disabling the band-switching operation upon determining that one the first WiFi frequency band and the second WiFi frequency band is unavailable.

6. The method of claim 1, wherein the computing device includes a wireless range extending device.

7. A computing device, comprising:
one or more data processors;
a first WiFi circuit for receiving a communication, wherein the communication is received on a channel of a first WiFi frequency band;
a second WiFi circuit; and
a non-transitory machine-readable storage medium containing instructions which when executed on the one or more data processors, cause the one or more processors to perform operations including:
determining both the first WiFi frequency band and a second WiFi frequency band are available for communication by the computing device, wherein the second WiFi frequency band is different from the first WiFi frequency band;
monitoring a throughput of the channel of the first WiFi frequency band, wherein the throughput of the channel includes a percentage of a maximum capacity of the channel;
comparing the throughput of the channel of the first WiFi frequency band to a throughput threshold level;
determining the throughput of the channel of the first WiFi frequency band is above the throughput threshold level;
automatically enabling a band-switching operation when both the first WiFi frequency band and the second WiFi frequency band are determined to be available and when the throughput of the channel of the first WiFi frequency band is determined to be above the throughput threshold level, wherein the band-switching operation is automatically disabled when the throughput of the channel of the first WiFi frequency band is determined to be below the throughput threshold level;
switching from the first WiFi frequency band to the second WiFi frequency band for transmitting the communication, wherein switching is performed when the band-switching operation is enabled, and wherein the switching enables the computing device to simultaneously receive communications on a channel of the first Wifi frequency band and transmit communications on a channel of the second WiFi frequency band; and
transmitting the communication, wherein the communication is transmitted using the second WiFi circuit on a channel of the second WiFi frequency band, and wherein the computing device is configured to transmit the communication while simultaneously receiving communications on the channel of the first Wifi frequency band.

8. The computing device of claim 7, wherein when the first WiFi frequency band includes a 2.4 gigahertz frequency band, the second WiFi frequency band includes a 5 gigahertz frequency band.

9. The computing device of claim 7, wherein when the first WiFi frequency band includes a 5 gigahertz frequency band, the second WiFi frequency band includes a 2.4 gigahertz frequency band.

10. The computing device of claim 7, further comprising instructions which when executed on the one or more data processors, cause the one or more processors to perform operations including:
determining that one of the first WiFi frequency band and the second WiFi frequency band has been disabled; and
continuing to enable the band-switching operation upon determining that one of the first WiFi frequency band and the second WiFi frequency band has been disabled.

11. The computing device of claim 7, further comprising instructions which when executed on the one or more data processors, cause the one or more processors to perform operations including:
determining that one of the first WiFi frequency band and the second WiFi frequency band is unavailable; and
disabling the band-switching operation upon determining that one the first WiFi frequency band and the second WiFi frequency band is unavailable.

12. The computing device of claim 7, wherein the computing device includes a wireless range extending device.

13. A computer-program product tangibly embodied in a non-transitory machine-readable storage medium of a computing device, including instructions configured to cause one or more data processors to:
receive a communication, wherein the communication is received on a channel of a first WiFi frequency band, and wherein the communication is received using a first WiFi circuit of the computing device;
determine both the first WiFi frequency band and a second WiFi frequency band are available for communication by the computing device, wherein the second WiFi frequency band is different from the first WiFi frequency band;
monitor a throughput of the channel of the first WiFi frequency band, wherein the throughput of the channel includes a percentage of a maximum capacity of the channel;
compare the throughput of the channel of the first WiFi frequency band to a throughput threshold level;
determine the throughput of the channel of the first WiFi frequency band is above the throughput threshold level;
automatically enable a band-switching operation when both the first WiFi frequency band and the second WiFi frequency band are determined to be available and when the throughput of the channel of the first WiFi frequency band is determined to be above the throughput threshold level, wherein the band-switching operation is automatically disabled when the throughput of the channel of the first WiFi frequency band is determined to be below the throughput threshold level;
switch from the first WiFi frequency band to the second WiFi frequency band for transmitting the communication, wherein switching is performed when the band-switching operation is enabled, and wherein the switching enables the computing device to simultaneously receive communications on a channel of the first Wifi frequency band and transmit communications on a channel of the second WiFi frequency band; and
transmit the communication, wherein the communication is transmitted using a second WiFi circuit of the computing device on a channel of the second WiFi frequency band, and wherein the computing device is configured to transmit the communication while simultaneously receiving communications on the channel of the first Wifi frequency band.

14. The computer-program product of claim 13, wherein when the first WiFi frequency band includes a 2.4 gigahertz frequency band, the second WiFi frequency band includes a 5 gigahertz frequency band.

15. The computer-program product of claim 13, wherein when the first WiFi frequency band includes a 5 gigahertz frequency band, the second WiFi frequency band includes a 2.4 gigahertz frequency band.

16. The computer-program product of claim 13, further comprising instructions configured to cause one or more data processors to:
determine that one of the first WiFi frequency band and the second WiFi frequency band has been disabled; and
continue to enable the band-switching operation upon determining that one of the first WiFi frequency band and the second WiFi frequency band has been disabled.

17. The computer-program product of claim 13, further comprising instructions configured to cause one or more data processors to:
determine that one of the first WiFi frequency band and the second WiFi frequency band is unavailable; and
disable the band-switching operation upon determining that one the first WiFi frequency band and the second WiFi frequency band is unavailable.

18. The computer-program product of claim 13, wherein the computing device includes a wireless range extending device.

* * * * *